United States Patent
Christopher et al.

(10) Patent No.: US 6,614,558 B1
(45) Date of Patent: Sep. 2, 2003

(54) ENGRAVER AND METHOD FOR FOCUSING AND MEASURING AREAS ON A WORKPIECE ENGRAVED BY THE ENGRAVER

(75) Inventors: Michael Duane Christopher, Dayton, OH (US); David Flannery, Dayton, OH (US); David R. Setiz, Vandalia, OH (US); Eric J. Serenius, Springboro, OH (US); Wei Zhao, Cincinnati, OH (US)

(73) Assignee: MDC Max Daetwyler AG (CH)

( * ) Notice: Subject to any disclaimer, the term of this patent is extended or adjusted under 35 U.S.C. 154(b) by 0 days.

(21) Appl. No.: 09/039,575

(22) Filed: Mar. 16, 1998

Related U.S. Application Data

(60) Division of application No. 08/415,638, filed on Apr. 3, 1995, now Pat. No. 5,737,090, which is a continuation-in-part of application No. 08/242,012, filed on May 12, 1994, now Pat. No. 5,492,057, which is a continuation-in-part of application No. 08/125,938, filed on Sep. 23, 1993, now Pat. No. 5,440,398, which is a continuation-in-part of application No. 08/038,679, filed on Mar. 26, 1993, now Pat. No. 5,438,422, which is a continuation-in-part of application No. 08/022,127, filed on Feb. 25, 1993, now Pat. No. 5,424,845.

(51) Int. Cl.[7] .............................. B41C 1/04; G06F 19/00
(52) U.S. Cl. ..................... 358/3.29; 358/406; 700/173; 700/175
(58) Field of Search ................................. 358/3.29, 3.3, 358/3.31, 3.32, 3.26, 406; 700/173, 174, 175, 195

(56) References Cited

U.S. PATENT DOCUMENTS

| | | | |
|---|---|---|---|
| 2,493,628 A | 1/1950 | Harley | 88/14 |
| 2,777,058 A | 1/1957 | Boyajean | 250/27 |

(List continued on next page.)

FOREIGN PATENT DOCUMENTS

| | | |
|---|---|---|
| EP | 0595324 | 5/1994 |
| RU | 931482 | 6/1982 |

OTHER PUBLICATIONS

"Numerical Analysis: A Practical Approach," by Melvin J. Maron, p. 188.

"The Image Processing Handbook," by John C. Russ, pp. 105–113, 1992.

(List continued on next page.)

Primary Examiner—Scott Rogers
(74) Attorney, Agent, or Firm—Jacox, Meckstroth & Jenkins

(57) ABSTRACT

An error detection apparatus and method for use with engravers, such as gravure engravers. An error value E corresponding to the difference between a set of predetermined setup parameters and actual measurement of a portion of an engraved area on the cylinder is determined. The error value E is then used to adjust the engraver to engrave an actual cut or etch in accordance with the set of predetermined setup parameters. Advantageously, an error detection and correction system is suitable for providing a closed-loop system for engraving a cylinder. The apparatus and method may be used during initial setup or during normal operation of the engraver. Other features include an autofocus routine to facilitate the auto-focus procedure. Also, image processing is further enhanced by gap filling, discontinuity removal, and light calibration methods which may be used alone, in combination with each other, or in combination with the automatic focus system and/or automatic shoe system.

33 Claims, 20 Drawing Sheets

U.S. PATENT DOCUMENTS

| | | | | |
|---|---|---|---|---|
| 2,874,479 | A | 2/1959 | Farber | 33/185 |
| 2,943,564 | A | 7/1960 | Demer | 101/93 |
| 3,280,252 | A | 10/1966 | Lilien et al. | 178/6 |
| 3,612,753 | A | 10/1971 | Korman | 178/5.2 |
| 3,652,992 | A | 3/1972 | Koll | 340/146 |
| 3,769,455 | A | 10/1973 | de Vos et al. | 178/6.6 |
| 3,770,888 | A | 11/1973 | de Vos et al. | 178/6.6 |
| 3,784,739 | A | 1/1974 | de Vos et al. | 178/6.6 |
| 3,876,829 | A | 4/1975 | Schreiber | 178/7.3 |
| 3,904,816 | A | 9/1975 | Taudt et al. | 178/6 |
| 3,918,348 | A | 11/1975 | Runft | 318/571 |
| 3,931,570 | A | 1/1976 | George et al. | 324/34 |
| 3,937,873 | A | 2/1976 | Gastineau | |
| 3,956,583 | A | 5/1976 | Pugsley | 178/6.6 |
| 4,001,495 | A | 1/1977 | Tauszig | 358/294 |
| 4,003,311 | A | 1/1977 | Bardin | 101/426 |
| 4,007,362 | A | 2/1977 | Sindermann | 235/151 |
| 4,012,584 | A | 3/1977 | Gascoigne | 358/302 |
| 4,052,739 | A | 10/1977 | Wada et al. | 358/299 |
| 4,057,838 | A * | 11/1977 | Doelves et al. | 358/3.29 |
| 4,072,928 | A | 2/1978 | Wilder | 340/146 |
| 4,075,662 | A | 2/1978 | Gall | 358/280 |
| 4,079,235 | A | 3/1978 | Froyd | 364/107 |
| 4,126,821 | A | 11/1978 | Cannon | 318/696 |
| 4,174,527 | A * | 11/1979 | Schaefer | 358/3.29 |
| 4,240,118 | A | 12/1980 | Wellendorf et al. | 358/296 |
| 4,315,285 | A | 2/1982 | Sommer et al. | 358/280 |
| 4,342,050 | A | 7/1982 | Traino | 358/256 |
| 4,342,052 | A | 7/1982 | Rackley et al. | |
| 4,347,785 | A | 9/1982 | Chase et al. | 101/1 |
| 4,357,633 | A | 11/1982 | Buechler | 358/299 |
| 4,361,402 | A | 11/1982 | Costa | |
| 4,363,037 | A | 12/1982 | Taudt | 358/296 |
| 4,394,693 | A | 7/1983 | Shirley | 358/293 |
| 4,437,122 | A | 3/1984 | Walsh et al. | 358/166 |
| 4,450,486 | A | 5/1984 | Buechler | 358/299 |
| 4,451,856 | A | 5/1984 | Buechler | 358/299 |
| 4,503,468 | A | 3/1985 | Serinken et al. | 358/256 |
| 4,603,391 | A | 7/1986 | Inoue et al. | 364/474 |
| 4,612,584 | A | 9/1986 | George et al. | 358/299 |
| 4,650,335 | A | 3/1987 | Ito et al. | |
| 4,678,976 | A | 7/1987 | Inoue | 318/577 |
| 4,683,499 | A | 7/1987 | Kuwabara | 358/264 |
| 4,683,500 | A | 7/1987 | Kitamura et al. | |
| 4,691,229 | A | 9/1987 | Colditz et al. | 358/280 |
| 4,691,238 | A | 9/1987 | Yamada | 358/280 |
| 4,700,235 | A | 10/1987 | Gall | 358/283 |
| 4,800,287 | A | 1/1989 | Green, Sr. | 250/560 |
| 4,944,593 | A | 7/1990 | Kalstroem et al. | 356/379 |
| 4,972,323 | A | 11/1990 | Cauwet | 364/474 |
| 5,029,011 | A | 7/1991 | Fraser | 358/299 |
| 5,061,949 | A | 10/1991 | Ogino et al. | |
| 5,113,249 | A | 5/1992 | Yosefi | 358/75 |
| 5,118,191 | A | 6/1992 | Hopkins | |
| 5,229,861 | A | 7/1993 | Nozaka et al. | 358/299 |
| 5,293,426 | A * | 3/1994 | Wouch et al. | 358/3.29 |
| 5,329,215 | A | 7/1994 | Fraser et al. | 318/603 |
| 5,416,597 | A | 5/1995 | Mubaslat | 358/299 |
| 5,422,958 | A * | 6/1995 | Wouch et al. | 358/3.29 |
| 5,424,845 | A | 6/1995 | Holowko et al. | 358/299 |
| 5,438,422 | A | 8/1995 | Holowko et al. | 358/299 |
| 5,440,398 | A | 8/1995 | Holowko et al. | |
| 5,481,379 | A | 1/1996 | Yosefi | |
| 5,617,217 | A | 4/1997 | Brewer et al. | |
| 5,652,804 | A | 7/1997 | Bronstein et al. | |
| 5,671,063 | A | 9/1997 | Auberry et al. | |
| 5,719,683 | A | 2/1998 | Yoshida | |
| 5,828,464 | A | 10/1998 | Yoshida et al. | |
| 6,075,233 | A | 6/2000 | Kato | |

OTHER PUBLICATIONS

Numerical Recipes in C: The Art of Scientific Computing, by William H. Press, Brian P. Flannery, Saul A. Teukolsky and William T. Vetterling, pp. 452,460 1988.

"Datwyler," Max Daetwtler Corporation, 13420 West Rees Blvd., Huntersville, NC 28078, undated brochure.

"Twin Pilot," Maschinenfabrik Kaspar Walter GmbH & Co. KG, Plinganserstrasse 22, 8000 Munchen 70, Germany.

"The Gravure Association of America, The Gravure Engraving Manual", 1987.

"Basic Rotogravure," Balcom, 1988.

"Druchtechnische Beratung–Graphischer Handel," Heimann GmbH, Germany, 1984.

"Check–Master," Heimann GmbH, undated pamphlet.

"Engraving Tester ET2000," Ahauser Tiefruck–Grauven GmbH & Co., undated pamphlet.

"M2B2 modele depose MICRO SURFACE Sarl", Promatec Graphique, Antony, France, 1987.

"VIP–Video–Image–Processing", author unknown, date unknown.

"Polishmaster Junior High–Precision Machining & Measuring Center for Rotogravure Cylinders," MDC Max Datwyler AG, CH–3368 Bleienbach/Schweiz, Switzerland, undated brochure.

Polishmaster High–Precision Maching & Measuring Center for Rotogravure Cylinders, MDC Max Datwyler AG, CH–3368 Bleienbach/Schweiz, Switzerland, undated brochure.

Finishmaster Unit for Polishing of rotogravure Cylinders After Copper or Chrome Plating, MDC Max Datwyler AG, CH–3368 Bleienback/Schweiz, Swizerland, undated.

"Cu–Master Type E Plating Tanks for Copper–Plating of Rotogravure Cylinders", MDC Max Datwyler AG, CH–3368 Bleienbach/Schweiz, Switzerland, undated.

"Cr–Master Type E Plating Tanks for the Chrome–Plating of Rotogravure Cylinders", MDC Max Datwyler, CH–3368, Bleienbach/Schweiz, Switzerland, undated.

JAV, "Getting Better Accuracy with Non–Precision Ball Screws", AMERICAN MACHINIST, Feb. 1993, pp. 50–51.

"Image Processing Algorithms for Industrial Vision", by Gerald J. Agin, SRI International, Feb. 9, 1979.

"Portascan–A New Dimension in Microscopic Measurment", Bradwell International, Inc., Elmhurst, Illinois, undated brochure.

"Cellscan 90", Bradwell International, Inc., Elmhurst, Illinois, undated brochure.

"Portascan–Portascan Gives the Printer or Engraver all the Cell Information He Requires", Scan Systems, Manchester, Brazil undat.

Imagen HR 1024 Series High Resolution Video Measuring System, Optech Instrument Corp., Greenvale, New York, Publication No. HR–10, Jan. 1991.

"Helio Klischograph K301 and K302 for Magazine Gravure Printing", Hell Graphic Systems, Inc., Dr. Ing. Rudolf Hell GmbH, PO Box 6229, D–2300 Kiel 14, undated.

Helio Klischograph K304 for Packaging and Product Gravure Printing, Hell Graphic Systems, Inc., Dr. Ing. Rudolf Hell GmbH, PO Box 6229, D–2300 Kiel 14, undated.

"Helio–Klischograph–Precisions Engraving in Copper", Hell Graphic Systems, Inc. Dr. Ing. Rudolf Hell GmbH, P.O. Box 6229, D–2300 Kiel 14, undated brochure.

"Computer Vision", by Dana H. Ballard and Christopher M. Browb, Prentice–Hall, Englewood Cliffs, New Jersey, 1982, Chapters 1–6.

"Automated Visual Inspection", by B. G. Batchelor, D. A. Hill and D. C. Hodges, IFS (Publications) Ltd., UK and North Holland (A Division of Elsevier Science Publishers E 1985, pp. 56–59, 81–83, 284–287, 290 and 292.

"Digital Picture Processing", 2nd Edition, vol. 2, Azreail Rosenfield and Avinash C. Kak, Academic press, Inc., Orlando, Florida, 1982, pp. 84–153.

"Pattern rocognition Wngineering", by Morton Nadler and Eric P. Smith, John P. Wiley & Sons, Inc., New York, New York, 1993, pp. 109–111, 556, 558.

"Video Calipers", Market Memo to P.I.D. Dealers by D. J. Joerger, Dec. 29, 1988.

"Video Microscope Measuring Systems", TM Bradwell International, Inc., Elmhurst, Illinois, 1991.

* cited by examiner

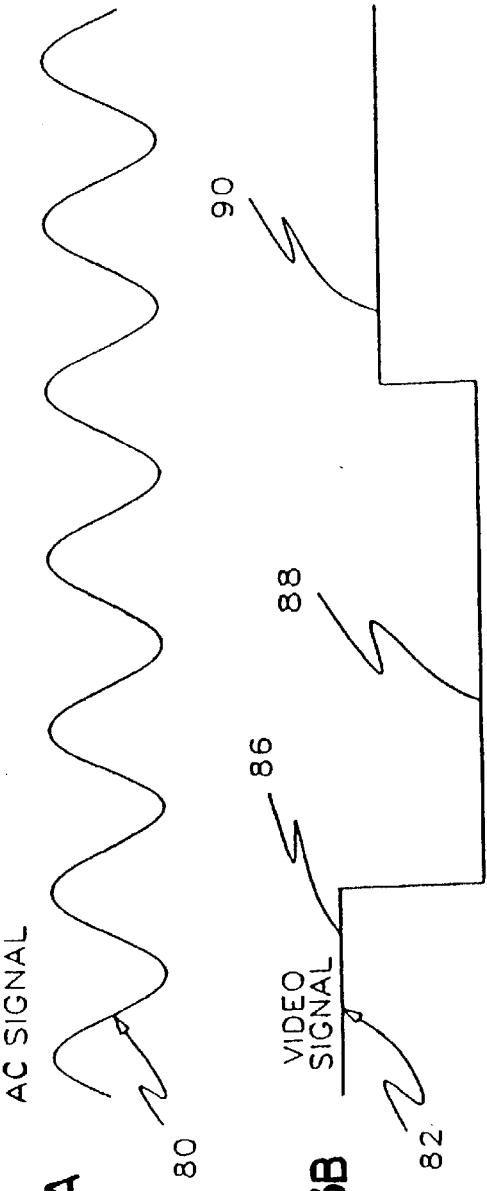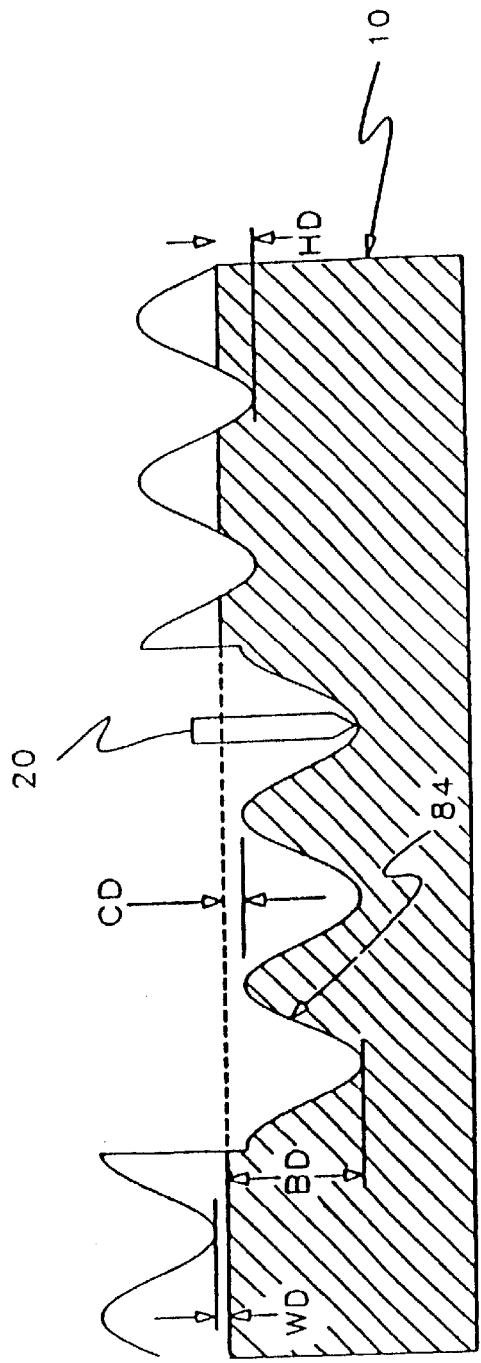
FIG-3A
FIG-3B
FIG-3C

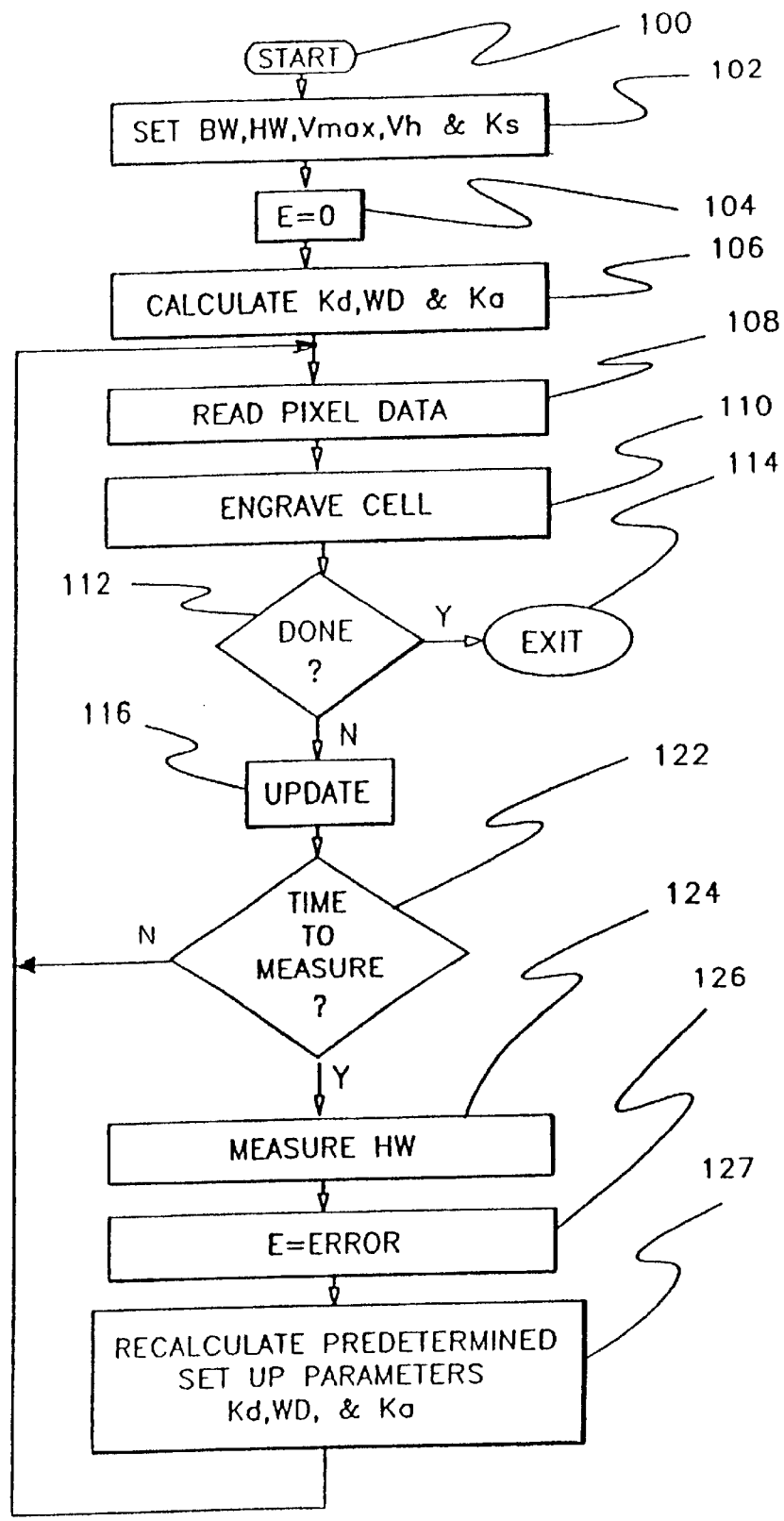

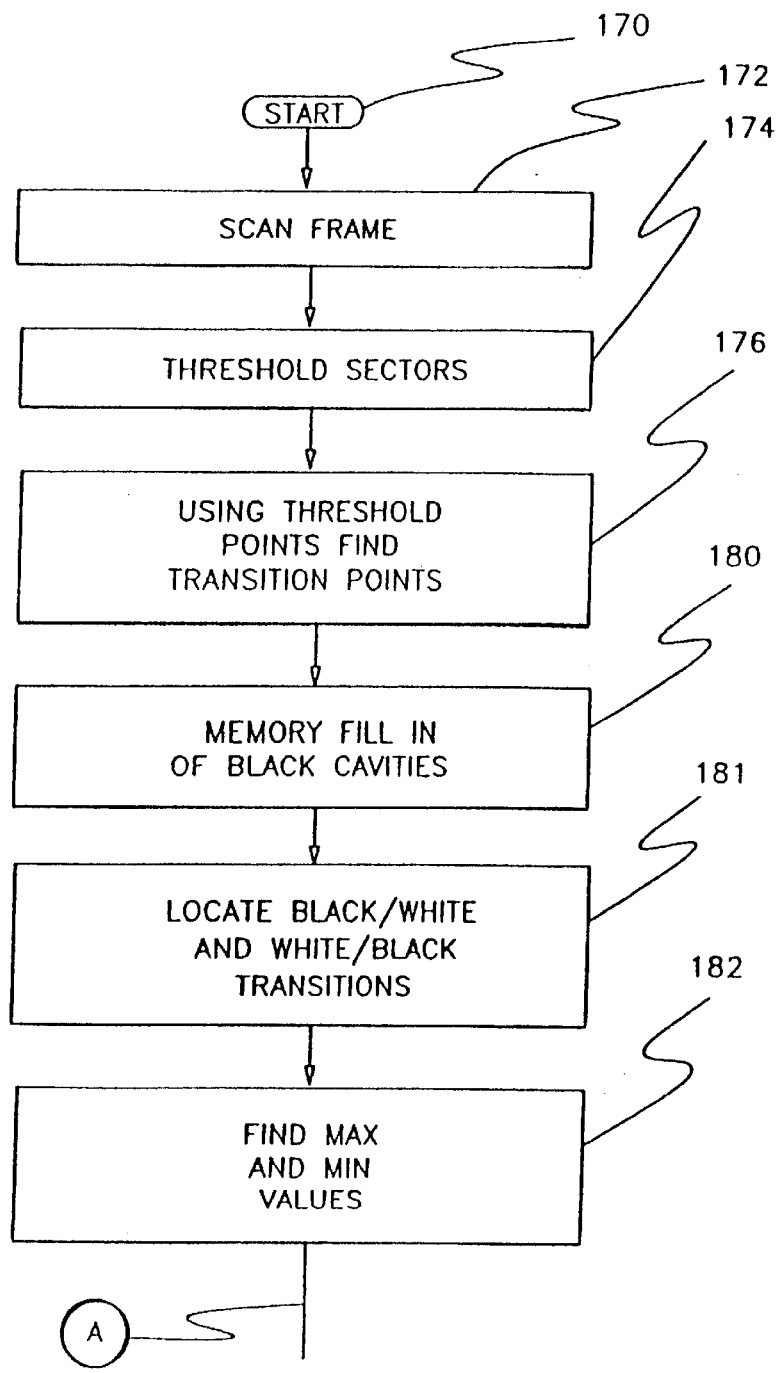

ENGRAVER AND METHOD FOR FOCUSING AND MEASURING AREAS ON A WORKPIECE ENGRAVED BY THE ENGRAVER

CROSS-REFERENCE TO RELATED APPLICATIONS

This is a divisional of application Ser. No. 08/415,638 filed Apr. 3, 1995 now U.S. Pat. No. 5,737,090, which is continuation-in-part of Ser. No. 08/242,012 filed May 12, 1994, now U.S. Pat. No. 5,492,057, which is a continuation-in-part of Ser. No. 08/125,938 filed Sep. 23, 1993, now U.S. Pat. No. 5,440,398, which is a continuation-in-part of Ser. No. 08/038,679 filed Mar. 26, 1993, now U.S. Pat. No. 5,438,422, which is a continuation-in-part of Ser. No. 08/022,127 filed Feb. 25, 1993, now U.S. Pat. No. 5,424,845.

BACKGROUND OF THE INVENTION

This invention relates to engraving heads of the general type disclosed in Buechler U.S. Pat. No. 4,450,486. Such engraving heads comprise a diamond stylus carried by a holder mounted on an arm projecting from a torsionally oscillated shaft. A sine wave driving signal is applied to a pair of opposed electromagnets to rotate the shaft through a maximum arc of approximately 0.25° at a frequency in the neighborhood of about 3,000 to 5,000 Hz.

A guide shoe is mounted on the engraving head in a precisely known position relative to the oscillating stylus. The engraving head is supported for tilting movement by a set of leaf springs secured to a rearwardly projecting bar. A DC motor rotates the bar so as to bring the guide shoe into contact with a printing cylinder to be engraved. When the guide shoe is in contact with the printing cylinder, the stylus oscillates from a position just barely touching the printing cylinder to a retracted position about 100 microns distant from the surface of the cylinder.

Once the guide shoe is in contact against the printing cylinder a video signal is added to the sine wave driving signal for urging the oscillating stylus into contact with the printing cylinder thereby engraving a series of controlled depth cells in the surface thereof. The printing cylinder rotates in synchronism with the oscillating movement of the stylus while a lead screw arrangement produces axial movement of the engraving head so that the engraving head comes into engraving contact with the entire printing surface of the printing cylinder.

In engraving systems of the type taught by Buechler, it is necessary for the machine operator to perform a tedious trial and error setup procedure at one end of the printing cylinder prior to commencement of engraving. This procedure involves adjustment of the gain on amplifiers for the sine wave driving signal and the video signal so as to produce "black" printing cells of a desired depth together with connecting channels of another desired depth and clean non-engraved white cells or areas. Each change of one of the control variables interacts with the others, and therefore the setup becomes an iterative process.

There is also a need in the engraving industry to provide an engraving system and apparatus with imaging and focusing capabilities which further facilitate automatically focusing on a surface of the cylinder and subsequently capturing images and measuring engraved areas on the surface. What is also needed is an engraving system which can quickly measure a dimension of a cut or cell, for example, of precisely controlled dimensions during set-up or real-time operation of the engraver.

There is a further need to provide a system and method for processing data corresponding to captured images, for example, by eliminating undesired image data or filling in discontinuous data corresponding to gaps in the array of data which correspond to gaps in a captured image.

What is also needed is an engraver comprising an apparatus or method for scaling or calibrating the intensity of light used in the focusing process to enhance automatically focusing, measuring and engraving cuts of precisely controlled dimensions.

It is therefore seen that a need has existed for an engraving system which may be quickly and easily set up to engrave cells of precisely controlled dimensions in the surface of a gravure printing cylinder.

SUMMARY OF THE INVENTION

In one aspect, this invention comprises a method for adjusting an engraver to engrave a cylinder with an actual cut according to predetermined setup parameters, said method comprising the steps of: (a) determining an error value corresponding to the difference between said predetermined setup parameters and an actual measurement of a portion of an engraved area on said cylinder; and (b) using said error value to adjust said engraver to engrave said actual cut in accordance with said predetermined setup parameters.

In another aspect, this invention comprises a method for measuring a portion of an engraved area on a cylinder in an engraver, said method comprising the step of generating a plurality of actual dimension values corresponding to said portion.

In still another aspect, this invention comprises a system for measuring a portion of an engraved area on a cylinder in an engraver, said system comprising a measuring device for generating a plurality of actual dimension values corresponding to said portion.

In yet another aspect, this invention comprises an error correction system for use in an engraver suitable for engraving a cylinder with an actual cut in accordance with predetermined setup parameters, said error correction system comprising determining means for determining an error value corresponding to the difference between the predetermined setup parameters and a measurement of the actual dimensions of a portion of an engraved area on said cylinder; and a system coupled to said determining means for receiving said error value and also for adjusting said engraver to engrave said actual cut in accordance with said predetermined setup parameters.

In still another aspect, this invention comprises a method for measuring a portion of a cylinder in an engraver, the method consists of the steps of focusing on a focus area of cylinder with an imager, imaging the portion with the imager, generating an array of data corresponding to the portion, and determining at least one actual dimension value using the array of data.

In another aspect, this invention comprises a system for imaging an area of a cylinder in an engraver, the system comprising an imager for capturing an image of the engraved area and a video processor coupled to the imager for generating a plurality of dimension values corresponding to the image, the imager comprising an illuminator capable of illuminating the area to a plurality of light intensity levels.

In another aspect, this invention comprises an engraver for engraving a plurality of cells on a surface of a cylinder engraver consisting of a support for rotatably supporting the cylinder, an engraving head for engraving the cylinder, the engraving head being mounted in operable relationship with the cylinder when the cylinder is rotatably mounted on the cylinder, and an image system associated with the engraving head for capturing an image of an area on the surface.

In a still further embodiment, a method for imaging an area of a surface of a cylinder comprises the steps of supporting the cylinder on an engraver in operative relationship with an engraving head, imaging the area of the cylinder with an imager associated with the engraving head to provide image data, and focusing the imager on a surface of the cylinder using the image data.

The present invention also provides an engraving apparatus and method wherein a plurality of parameter signals are supplied to a setup circuit or computer for computing engraving parameters to control the engraving response of the engraving stylus to an input video signal. An input AC signal and an input video signal are multiplied by multiplication factors which are generated by the computer. The computer also generates a white offset signal which is combined with the above mentioned multiplication factors to produce a driving signal for the engraving stylus. The stylus then engraves cells of the desired geometry.

The computer is provided with input signals which indicate a desired black cell width, a desired channel width, a desired highlight cell width and the video voltage level at which a highlight cell of the desired width is to be engraved. The values of these parameters are used for solving a set of equations which produce the appropriate values for the two multiplication factors and the white offset.

A video camera is operated to produce a frame of video information including an image of an engraved area, such as a cell, which has been engraved by a video signal of a predetermined level. A video processing circuit measures the width of the cell which has been so imaged and reports it to the computer. The computer then adjusts the multiplication factors and the white offset through use of an error term which is equal to the difference between the expected cell width and the measured cell width.

BRIEF DESCRIPTION OF THE DRAWINGS

FIGS. 3A–3C are time correlated schmeatic illustrations of AC and video signals for controlling an engraving stylus and the engraving movement which results therefrom;

FIG. 4 is a flow chart illustrating the method of cell width control in accordance with the invention;

FIGS. 8A and 8B, taken together, show a flow chart of another measuring algorithm;

DESCRIPTION OF THE PREFERRED EMBODIMENT

Figure 1:
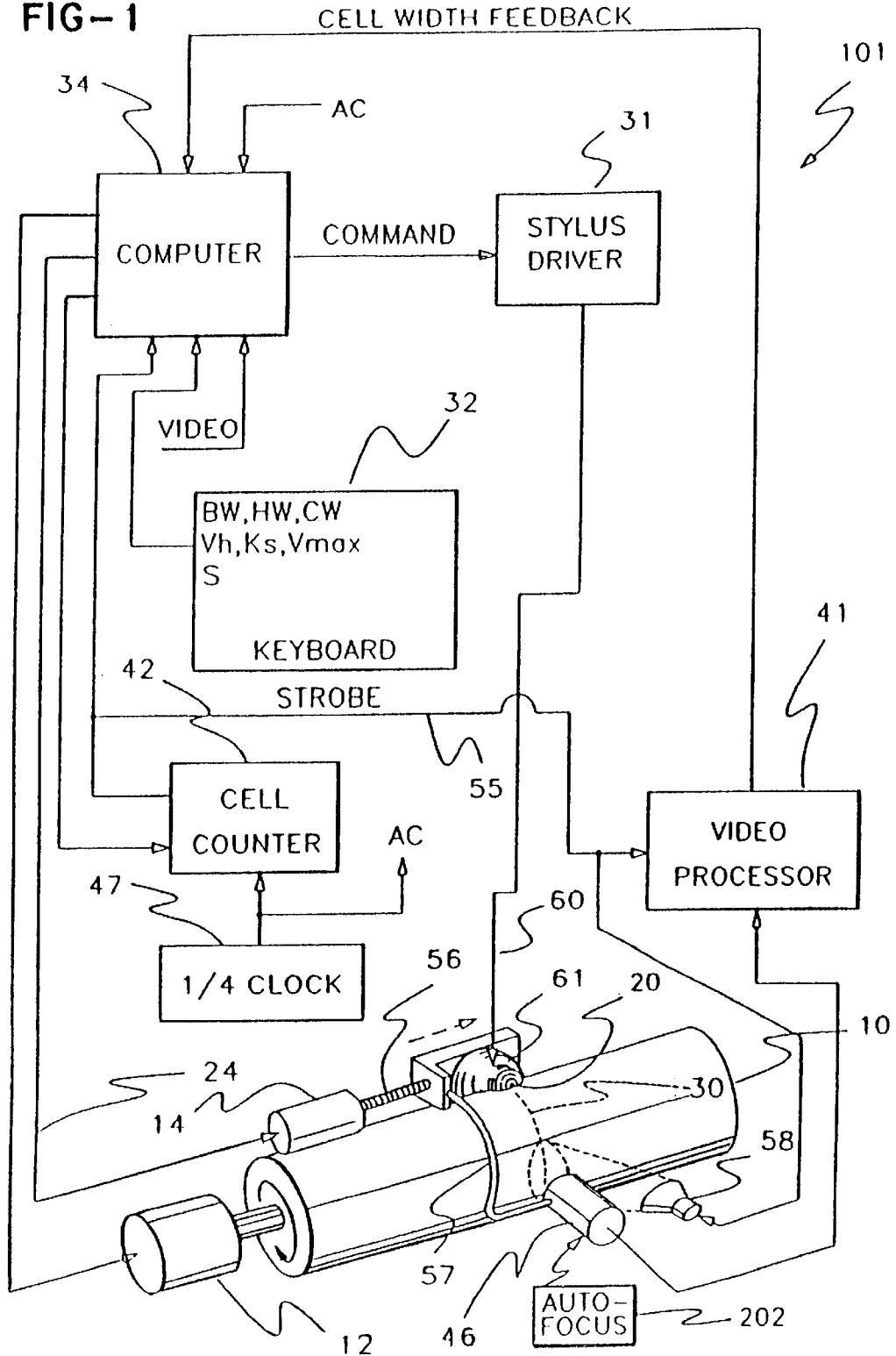
FIG. 1 is a schematic illustration, partly in perspective, of a programmable engraving system according to the present invention.

Referring to FIG. 1 there is illustrated a gravure printing cylinder 10 mounted for rotation by a drive motor 12 and engraving by an engraving stylus 20. During the engraving operation, stylus 20 moves engravingly toward and away from printing cylinder 10 to produce a series of cells arranged along a track 30. A lead screw motor 14 rotates a lead screw 56 to cause movement of stylus 20 in a direction parallel to the axis of cylinder 10. If lead screw motor 14 moves continuously, then track 30 will have a helical configuration. Intermittent energization of motor 14 produces a series of spaced circular tracks 30.

Stylus 20 is driven into engraving contact with print cylinder 10 by an electromagnetic driver 61 operating in response to a drive control signal on line 60. Electromagnetic driver 61 may be configured as generally disclosed in Buechler U.S. Pat. No. 4,450,486.

The signal on line 60 has an AC component, a video component and a white offset component appropriate for producing an engraving action as hereinafter described. The AC component is derived from an AC input signal generated by a clock 47 and applied to a computer 34. The AC input signal is multiplied by a multiplication factor Ka as described in detail in Ser. No. 08/022,127. Computer 34 generates the video component by calculating another multiplication factor Kd and multiplying it against a video input signal. The white offset is derived from an offset signal WD.

Computer 34 generates the parameters Ka, Kd and WD by solving a set of three equations as described below. A control panel or keyboard 32 is provided in order to enable entry of values for six constants appearing in the three equations. These constants are black cell width, BW, highlight cell width, HW, channel width CW, the video voltage, Vh, corresponding to HW, stylus constant, Ks, and the black cell voltage, Vmax. A shoe offset, S, may also be entered if desired.

As hereinafter discussed in more detail, the AC component of the signal on line 60 causes stylus 20 to oscillate in a sinusoidal manner relative to printing cylinder 10 with a wavelength dependent upon the surface speed of the cylinder. The rotational speed of drive motor 12 must be adjusted so as to produce an engraving track 30 having an odd number of half wavelengths during a full engraving rotation. Computer 34 transmits a lead screw control signal to lead screw motor 14 via a line 24. This signal is adjusted so as to cause lead screw motor 14 to advance stylus 20 an axial distance equal to one-half of a black cell width plus one-half of a connecting channel width, plus one separating wall width during each complete rotation of the printing cylinder 10.

The equations for Ka, Kd and WD assume a linear relationship between the input video signal and a resultant engraved cell width. While this is a fairly accurate assumption in many cases, there are times when adjustments are required. If so, then tabulated corrections may be made as taught in Ser. No. 08/022,127, the parent application hereof, the disclosure of which is incorporated herein by reference.

Another problem is drift. Although computer 34 may be programmed properly and may initially produce correct cell widths, gain changes in analog components or mechanical changes in the positioning of the shoe which supports stylus 20 may require incorporation of an adjustable correction term in the algorithm employed for calculation of Ka, Kd and WD. For this purpose there is a videoing means or imager, such as video camera 46, which is focussed on track 30. The video camera 46 views a portion of track 30 which is illuminated by a strobed lamp 58 and provides frames of video feedback information to a video processor 41. Strobe signals for lamp 58 are provided at the correct frequency and phase by a cell counter 42 on line 55.

Although not shown, in the embodiment of the invention, the strobed lamp 58 is integral with the video camera 46 so that the strobe flashes through a lens (not shown) of video camera 46. In addition, the video camera 46 may have an auto-focus camera or attachment 202 for enabling it to focus on any size print cylinder 10. The video processor 41 is capable of controlling the autofocus feature so that if, for example, the printing cylinder 10 is changed to a printing cylinder having a different radius. The video processor 41 includes conventional circuitry to ensure that the image is in focus. Cell counter 42 counts pulses generated by a clock 47 at four times the AC frequency. At this frequency a clock pulse is generated each quarter wavelength of engraving stylus oscillation.

Figure 2:
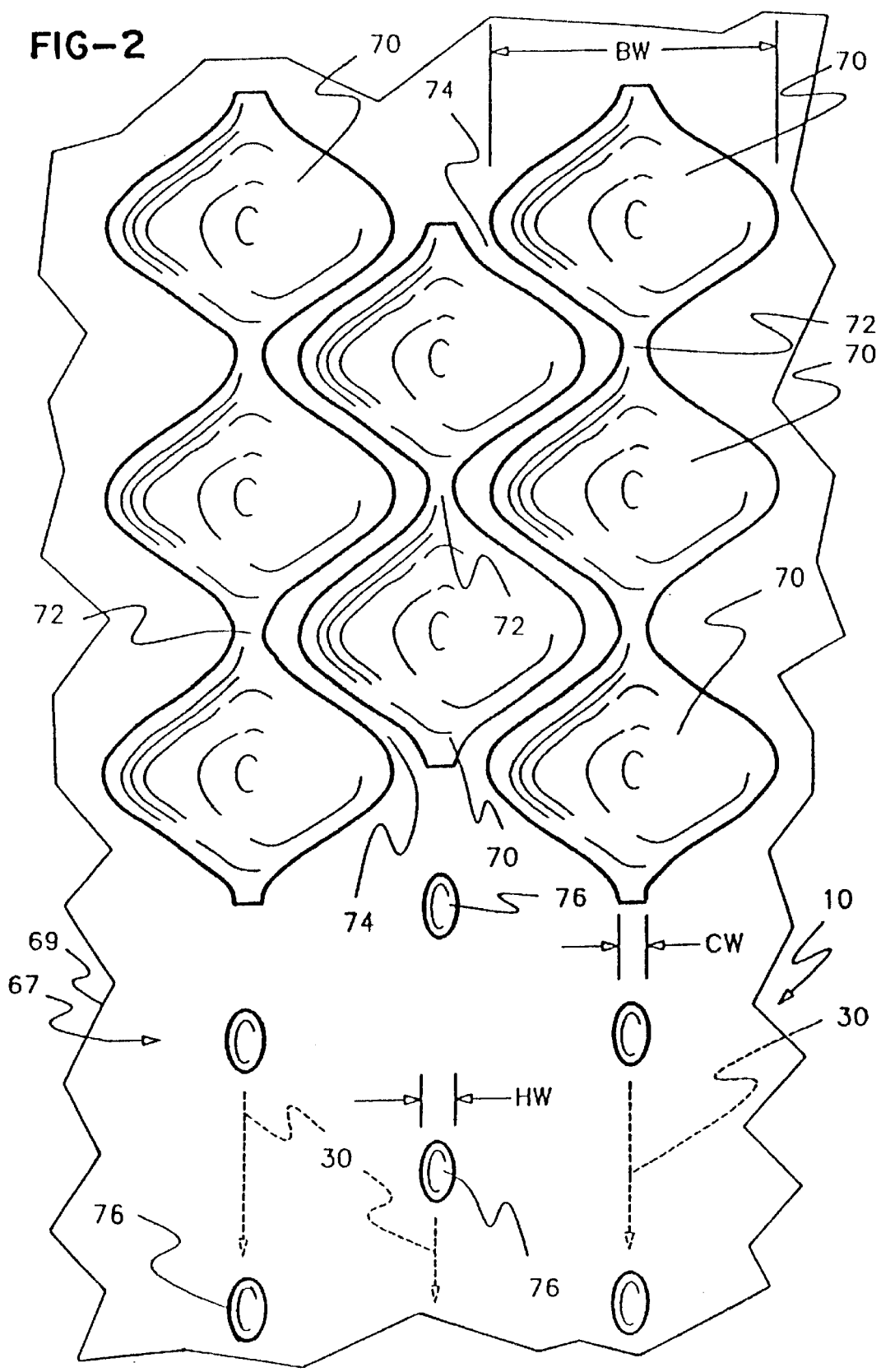
FIG. 2 is a schematic illustration of a series of cells engraved in a printing cylinder.

The geometrical configurations of typical black cells, connecting channels for black cells, highlight cells and separating walls are illustrated in FIG. 2. That figure depicts a series of wide, deep black cells 70 and a series of shallower and narrower highlight cells 76. The illustrated cells comprise portions of three side-by-side engraving tracks 30. Black cells 70 have a maximum width BW. The control signal for the stylus is adjusted so as to produce connecting channels 72 between successively engraved black cells 70. Channels 72 have a width CW, while highlight cells 76 have a width HW. The scalloped edges of the cells 70 result from the vertically oscillating cutting action of stylus 20 during rotational movement of printing cylinder 10 thereunder. As further illustrated in FIG. 2, a series of successively engraved black cells 70 may be separated by a wall 74 from a series of successively engraved cells 70 (also illustrated as being black cells) in an adjacent engraving track 30.

A series of cells configured as illustrated in FIG. 2 will print a graphic pattern defining a diagonally extending screen. The tangent of the screen angle is the ratio of the black cell width to the wavelength of the stylus cutting motion. The cutting wavelength is a function of the surface speed of the printing cylinder 10 and the oscillation frequency of stylus 20. Thus, the screen angle may be adjusted by adjusting the rotational speed of drive motor 12, but such adjustment must be made in incremental steps so as to maintain an odd number of half wavelengths around the circumference of the printing cylinder. Alternatively, the screen angle may be adjusted by adjusting the black cell width and the operating speed of lead screw motor 14.

The driving signals for stylus 20 and the resulting vertical movement of the stylus 20 are illustrated in FIGS. 3A–3C. The driving signal (FIG. 3C) is obtained by adding an AC signal 80 (FIG. 3A) to a video signal 82 (FIG. 3B). The illustrated video signal 82 has, by way of example, a white video level 86, a black video level 88 and a highlight video level 90. The video signal and the AC signal are combined with an offset such that the stylus is raised out of contact with the cylinder surface during the entire time that video signal 82 has a white level 86. The minimum white elevation is WD.

When video signal 82 goes from a white level to a black level, stylus 20 moves into engraving contact with the cylinder as shown by stylus position line 84. In this condition the stylus oscillates between a minimum depth CD and a maximum depth BD. When stylus 20 is at the depth CD, it engraves a connecting channel 72. When video signal 82 shifts to a highlight level as indicated by the reference numeral 90, stylus 20 oscillates between a position out of engraving contact with cylinder 10 to an engraving position having a maximum depth HD. AC signal 80, video signal 82 and a white offset signal are produced by a setup circuit in computer 34.

In general, a set of predetermined setup parameters (BW, HW, CW, Vh, Ks and Vmax) may be inputted into control panel 32. These predetermined setup parameters generally correspond to the desired dimensions of, for example, either the highlight cell 76 or cell 70. These parameters are received by computer 34 which, in turn, generates a plurality of energizing signals (Ka, WD and Kd) in response thereto. The input signals control the depth of stylus 20 at any instant in time. In the embodiment being described, the computer 34 determines the depth of stylus 20 by using the following equations.

$$D(t)=Ka*A*(\sin(\omega*t)-1)-WD+Kd*V(t)$$

where:
Ka=gain factor of the AC amplifier
A=maximum value of the AC reference signal
$\omega$=frequency of AC reference signal
t=time
WD=white offset
Kd=gain factor of video amplifier
V(t)=video voltage at input (function of time)
The maximum black depth occurs when $\sin(\omega*t)=1$ and v(t)=Vmax. Therefore the black depth is given by:

$$BD=Kv*V\text{max}-WD \quad (1)$$

The channel depth CD occurs when $\sin(\omega*t)=0$ and v(t)=Vmax. Therefore the channel depth is given by:

$$CD=Ka*A-WD+Kv*V\text{max} \quad (2)$$

The highlight depth HD occurs when $\sin(\omega*t)=1$ and v(t)= highlight voltage Vh. Therefore:

$$HD=Kv*Vh-WD \quad (3)$$

For an engraving operation using a stylus having a cutting tip angle (tip), the depths BD, CD and HD are respectively equal to Ks*BW, Ks*CW and Ks*HW, where Ks is a stylus constant given by the equation:

$$Ks=1/(2*TAN\ (tip/2)).$$

Making the above indicated substitution, equations (1)–(3) can be rearranged to produce:

$$Kv=Ks*(BW-HW+E)/(Vmax-Vh) \quad (4)$$

$$WD=Kv*Vmax-Ks*BW \quad (5)$$

$$Ka=(Ks*CW+WD-Kv*Vmax)/A \quad (6)$$

where E is an error which is used to correct the solution for observed errors in HW.

Equations (4)–(6) may be solved in sequence. Thus the value of Kv obtained from the solution of Equation (4) may be used in the solutions of Equations (5) and (6), and the value of WD obtained from Equation (5) may be used in Equation (6). Computer 34 proceeds in this fashion to calculate Kv, WD and Ka. Alternatively, the screen angle (SA) and the wavelength (WL) of the stylus cutting motion may be used as setup parameters. In that case BW may calculated from the equation:

$$BW=WL*\tan\ (SA)$$

This value of BW then is used in the computation of the engraving parameters.

In the event that there is a small error in the positioning of the shoe against printing cylinder 10, then an additional predetermined setup parameter S may be supplied to computer 34. If this parameter is provided, it is treated as a depth offset which is multiplied by Ks and added to BW, CW and HW prior to performing the above outlined solution.

Figure 5:
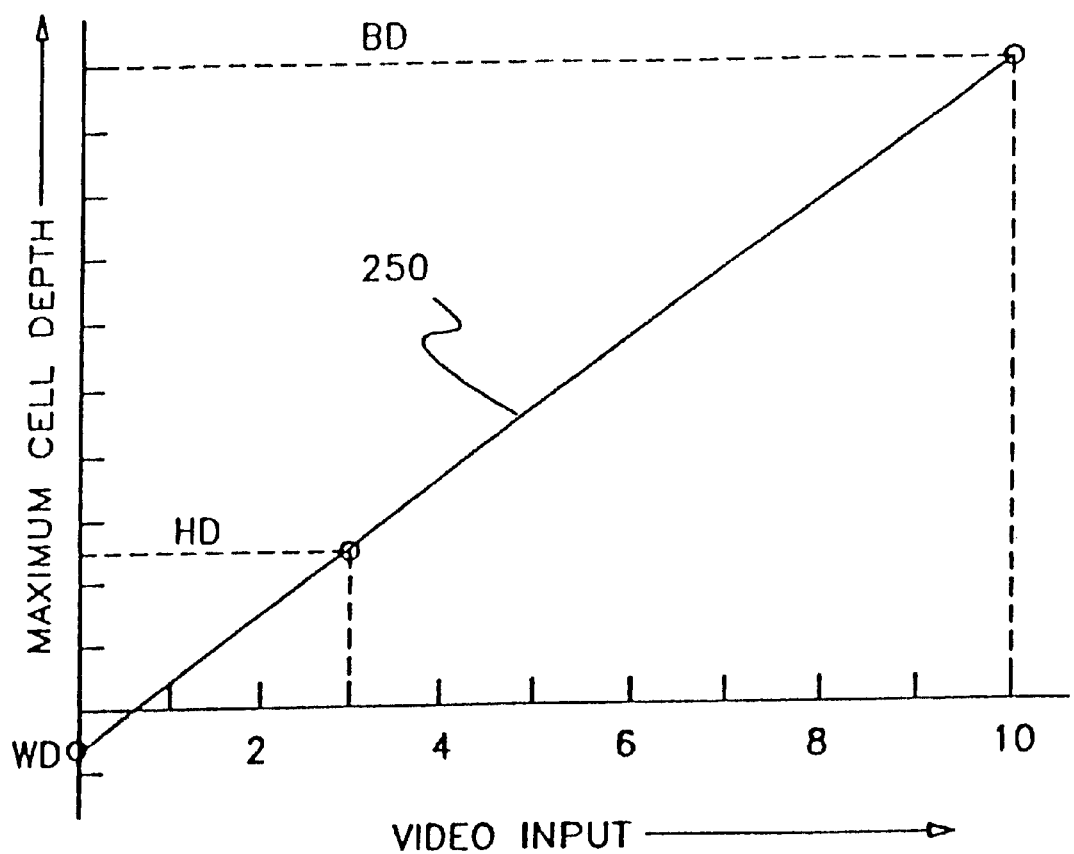
FIG. 5 is a graphical plot of the maximum cell depths resulting from video input signals ranging from 0 to 10 volts.

Referring now to FIG. 5, the maximum cell depth is seen to be directly proportional to the video input signal. As illustrated in the figure, a maximum 10 volt video input signal produces the maximum cell depth BD required for engraving a black cell. For the illustrated example, computer 34 has been given a highlight width HW=0.25*BW. Hence the highlight depth HD is 25% of BD. The Figure also reflects a setting of 3 volts for Kh. Under those conditions a video signal having an amplitude equal to 30% of a "black" video signal produces a cut having a depth which is only 25% of the black cell depth. As a result the maximum cell depth goes to zero for a video input of about 0.7 volts. For video signals smaller than that amount, the cutting stylus remains out of contact with the printing cylinder. For a "white" video input the stylus is retracted from the engraving cylinder by a minimum distance WD, which is the white offset.

During the initial setup of the print cylinder 10 for engraving or even after engraving has begun, it may be desirable to adjust the predetermined setup parameters BW, HW, CW, Vh, Ks, and Vmax and their associated energizing signals Kd, WD and Ka to reflect differences between the predetermined setup parameters and an actual measurement of a portion of an engraved area (FIG. 2). This facilitates providing a closed-looped system which can be self-adjusting and self-monitoring. In order to effect this closed-looped system, it is necessary to calculate an error value which generally corresponds to difference between the predetermined setup parameters and an actual measurement of the portion of the engraved area on the print cylinder. Once the error value is determined, the computer 34 can adjust the predetermined setup parameters and corresponding energizing signals Ka, WD and Kd in response to the error value E.

It is important that camera 46 may be adjusted for viewing a precisely determined position of track 30. It is to be noted that an individual cell is strobed while the engraver is engraving. For this purpose, stylus 20 is activated to engrave a test track at one end of cylinder 10. Although it is possible that an operator could view a monitor or display (not shown) and manipulate a cursor control knob (not shown) on the above-mentioned keyboard, computer 34 is capable of automatically strobing a flash and capturing an image on the video camera 46. The video processor gets the new image and measures the width of the strobed cell and its associated channel. This information is sent to computer 34 as cell size feedback information. Since there is a distance between the stylus 20 and the camera pickup 46, computer 34 has to save a cell position distance count between camera 46 and stylus 20. The computer uses this position offset count to time strobes on line 55 for imaging specific cells known to have been engraved at particular points in time.

FIG. 4 illustrates the overall process involved in controlled engraving and error correction system according to one embodiment of the present invention. The process begins at an entry point indicated by the reference numeral 100. The first step is the entry of the setup parameters BW, HW, CW, Vmax, Vh and Ks (Block 102). These parameters may be read from a disk file or entered into a keyboard by an operator. In the case of operator entry, the predetermined setup parameters may be obtained by visual observation of cells in a manually controlled sample track which is cut at one end of printing cylinder 10. However entered, the predetermined setup parameters are stored in computer 34 for setup control. Computer 34 then sets the value of the error term, E, equal to a zero (Block 104) and proceeds to calculate the engraving drive parameters Kd, WD and Ka using equations (4)–(6) above (Block 106). This puts the system in readiness to commence engraving.

Once the engraving drive parameters are available, computer 34 generates the energizing or control signals which cause video pixel data to be read from an appropriate data file (Block 108). Other control signals activate drive motor 12, lead screw motor 14 and, workhead 16, and engraving begins (Block 110). Computer 34 then begins checking the progress of the engraving job (Point 112). The system exits at Point 114 when the job is done.

In one embodiment, the error value E may be determined by using one predetermined setup parameter, namely, Vh. In general, the error correction system calculates error value E by comparing the most frequently occurring value of Vh for a plurality of cells that have actually been cut to a value of Vh which is determined by taking an actual measurement of a preselected cell 606 (FIG. 6) which has been cut. A most frequently occurring value of Vh is assumed to be the system setup parameter or the predetermined setup parameters. Therefore computer 34 maintains a record of the frequency of occurrence of different values of Vh (Block 116) and compares the set value of Vh against the value of Vh which is found to be most frequently occurring. When the set value is found to deviate more than a prescribed minimum amount from the most frequently occurring value, then the predetermined setup parameters and corresponding energizing signals are adjusted. In the embodiment being described, a corresponding new value of HW may be calculated. This calculation involves solution of the equation:
ti $HW=(Kd*Vh-WD)/Ks.$ As the engraving proceeds, periodic checks are made to ascertain whether the system is engraving highlight cells of width HW in response to video input signals of voltage Vh.

When a measurement time arrives, as indicated by the check at Point 122, the system proceeds to Block 124. This block involves a strobing of lamp 58 which causes camera 46 to generate a frame of video information. Video processor 41 is also strobed to measure the width of a highlight cell which appears in the video frame and which is known to have been engraved in response to a video voltage Vh. The error term, E, is set equal to the difference between the actual measured value HW and the current setting of HW. The system then proceeds to Block 127 where the predetermined setup parameters, such as Kd, WD and Ka, are recalculated in computer 34 using the new value of E. This has the effect of eliminating or reducing the error value E. The system then returns to block 108.

Video camera 46 is mounted on a frame 57 supported by lead screw 56. Camera 46 is adjustable relative to frame 57 so as to generate frames of video information which are centered upon track 30. Preferably, camera 46 comprises a CCD array which produce a new frame of video information with each flash of lamp 58.

It is important that camera 46 be adjusted for viewing a precisely determined portion of track 30. For this purpose stylus 20 is activated to engrave a test track at one end of cylinder 10. Computer 34 saves a position count and uses it to time the strobes on line 55 for imaging specific cells known to have been engraved at particular points in time.

Figure 6:
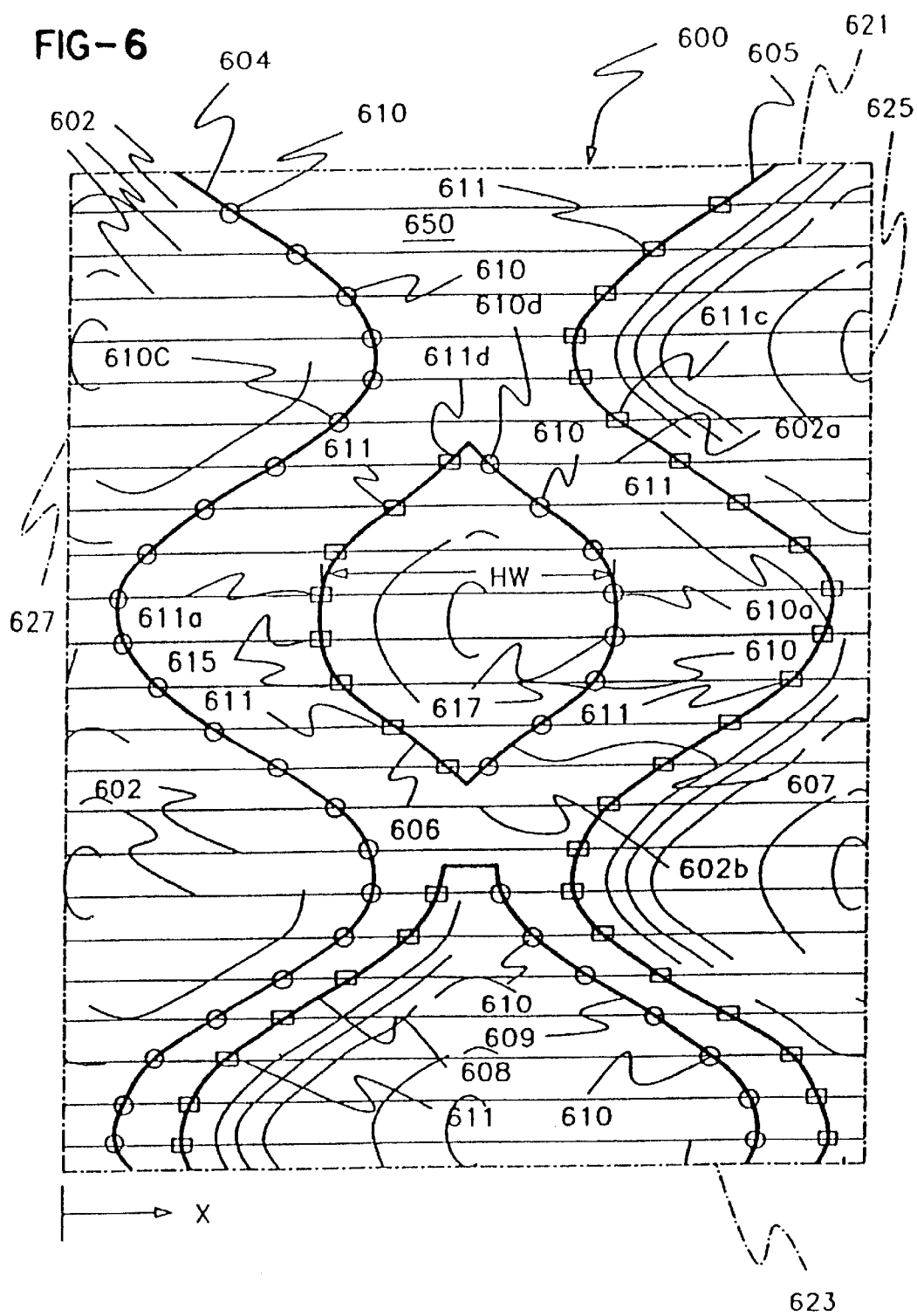
FIG. 6 is a schematic illustration of a video frame including a highlight cell.

FIG. 6 illustrates a typical frame of video information 600 including a highlighted cell 606 which was engraved PC clock counts prior generation of the strobe which produced the frame 600. Frame 600 comprises a series of horizontal lines which are too numerous for illustration. Representative horizontal video lines are indicated by the reference numerals 602. These lines are a subsampling of the cell image captured by the strobe. The actual cell size dimensions are measured from these lines.

Video processor 41 processes lines 602 sequentially from top to bottom. The video information goes through localized thresholding (not shown). Pixels which are lighter than the threshold are deemed to be white, whereas pixels which are darker than the threshold are deemed to be black. In the embodiment being described, the threshold amounts are set at a preselected gray scale levels.

As each line of video information is processed by thresholding, it is examined for the presence of black/white and white/black transitions. FIG. 6 illustrates black/white transitions by symbols denoted by the reference numeral 610, whereas white/black transitions are denoted by symbols indicated by the reference numeral 611. This establishes a series of boundary lines as illustrated in FIG. 6 by reference numerals 604, 605, 606, 607, 608 and 609. These boundary lines define a white region 650.

Video processor 41 recognizes the white region 650 by a black/white transition 610 followed by a white/black transition 611. For each such transition pair, video processor 41 establishes a first linked list. If the programming is performed in the C language, for example, then such a linked list may be represented by an entity known as a structure. Each such linked list includes the X coordinates of the left and right boundaries of the white region indicated by the transition pair. The linked lists for each scan line 602 are associated with the linked lists of the preceding scan line by comparison of the boundary points.

For the first six video lines 602 of FIG. 6, only one white span (and one linked list) appears. However, on the seventh horizontal line, denoted by the reference numeral 602a, two additional transition points 611d, 610d appear. These two new transition points mark the boundaries of highlight cell 606. It can be seen that the appearance of highlight cell 606 causes a "split" in the white region 650. Video processor 41 reacts to this split by establishing a second and third linked lists to replace the first linked list previously being processed.

Once a split is observed, the video processor knows that highlight cell 606 is present The video processor then compares the left boundary of the third linked list with the right boundary of the second linked list to determine the width of the highlight cell 606. The highlight width is calculated for each scan line 602 and compared with the highlight width calculated for the preceding scan line. Each time a comparison is made, video processor 41 saves the larger value. The process continues until the intermediate black region disappears (at 602b) and the two legs of white region 650 merge. At this point the measurement ceases and the processor saves the observed maximum value of HW. Video processor 41 passes this value of HW to computer 34. The computer 34 associates the reported value of HW with the specific engraving command, which was sent to stylus 20 PC clock counts earlier than the strobe which produced the video frame.

Figure 7:
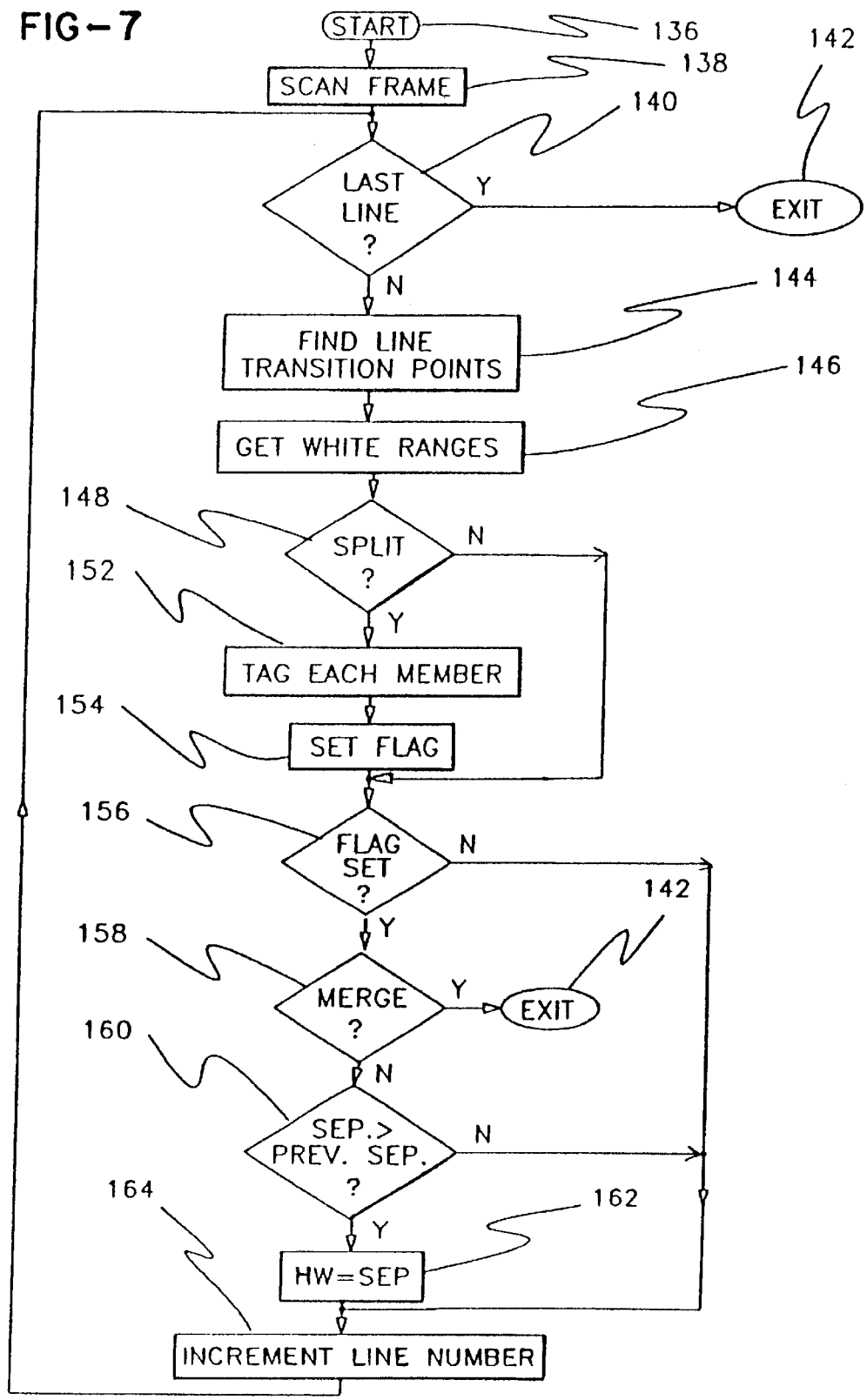
FIG. 7 is a flow chart of a cell width measuring algorithm.

FIG. 7 illustrates the above outlined measuring process in flow chart form. Thus, HW measurement begins at a start point 136 and proceeds to a scanning step at block 138. As discussed above, frame grabbing or scanning is initiated by a strobe signal on line 55. It should be appreciated that the cylinder could be stationary (i.e., not revolving) during the videoing, measuring and error correction process. It should also be noted that the system and method for measuring may be used independently to provide means for measuring portions of actual cuts in cylinder 10. Thus, the system and method of measuring per se could be used to measure the actual measurements for display on a monitor (not shown) so that subsequent manual adjustments, for example, can be made to correct for any errors.

Once a frame has been scanned the video processor checks the line number at point 140. If the bottom of the frame has been reached, then there is an exit at point 142. Assuming that the frame bottom has not been reached, the program proceeds to block 144 where it establishes transition points 610, 611. Then the program obtains the white ranges at block 146 for use in the above-described linked lists. Next the program looks for a split at point 148. If a split is noted, then the two resulting linked lists are tagged at block 152 and a flag is set at block 154.

The program checks the state of the flag at point 156 and jumps down to block 164 for a negative result. This means that the top of highlight cell 606 has not yet been reached and there is no need to measure a cell width. Consequently, the program simply increments the line number at block 164 and returns back to point 140.

If the check at point 156 indicates that the flag has been set, then the program checks for a merge at point 158. If a merge is noted, then the program exits from the measurement routine. If a merge has not yet occurred, then the program checks the separation distance between the two legs of the white region 650. This distance is compared at point 160 against previously saved separation distances. If the new separation distance is greater than any previously saved distance, then HW is set equal to that distance. Referring again to FIG. 6, the first separation distance is the distance between points 611d and 610d. This distance keeps increasing until the program reaches points 611a and 610a. At that point the separation distance is maximum, and no further adjustments of HW are made.

The video processor 41 then feeds the measured value of HW back to computer 34 and it is compared to the most frequently occurring value of HW. If the difference is below a predetermined threshold or zero, then no adjustment is made to the predetermined setup parameters. If on the other hand, there is a difference between the HW measured and the most frequently occurring value of HW, then computer 34 adjusts the predetermined setup parameters until the engraver is cutting cells that fall within the predetermined setup.

Thus, in the embodiment being described, this invention comprises a method for measuring a portion 67 (FIG. 2) of an engraved area 69 on the cylinder 10 during rotation of the cylinder 10 or while the cylinder 10 is stationary. The method uses video processor 41, videocamera 46 and strobe 58. The method comprises the steps of videoing the portion 67 of the engraved area 69 and generating a video image (such as the image shown in FIG. 6) corresponding thereto. These steps are effected by using the video processor 41 to process the video image data in order to determine the actual measurements of the portion which was videoed.

Figure 8B:
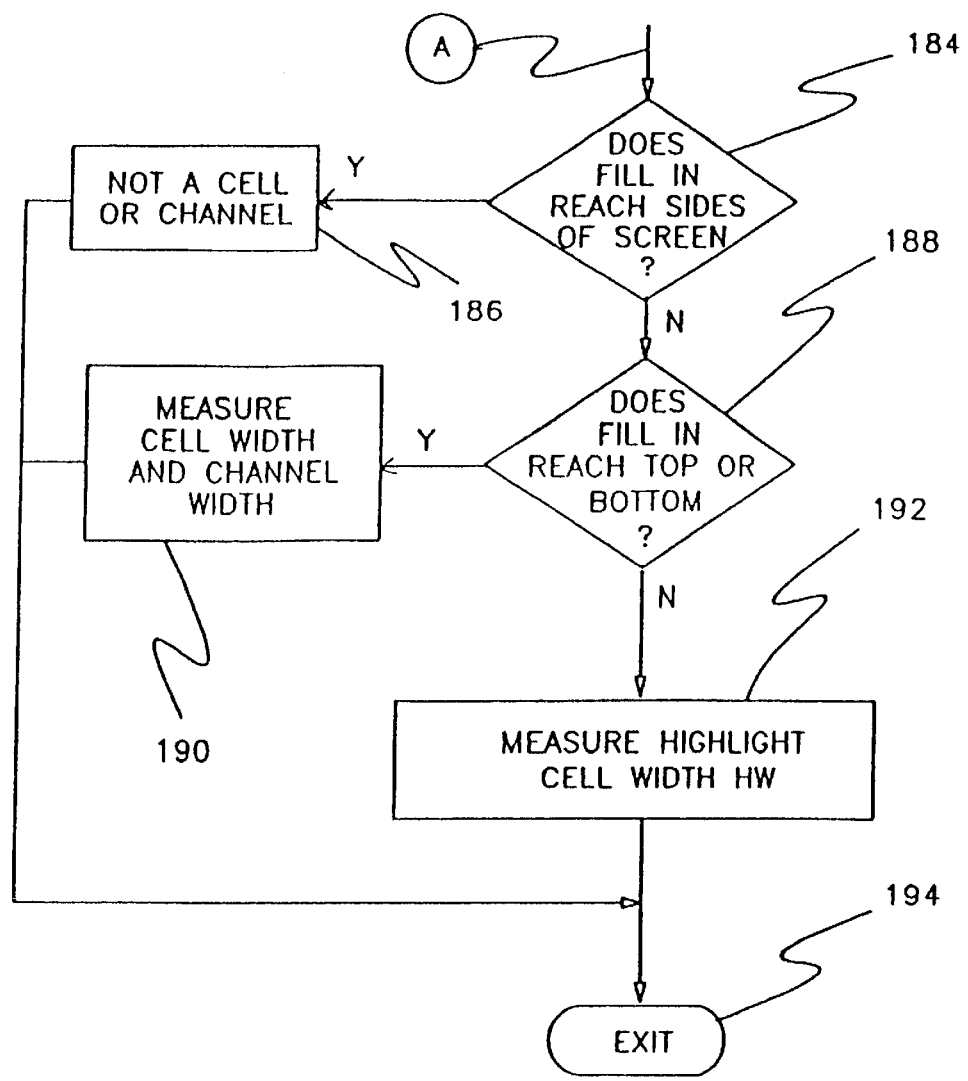

FIG. 8 shows another embodiment of the invention wherein the cell width BW, channel width CW, highlight width HW, and error value E are measured and determined using a similar technique. In this embodiment, video processor 41 determines the existence of the white region 650 by the black/white transition 610 followed by a white/black transition 611. The cell which was actually measured and strobed is assumed to be generally located in the center of the scan frame 600.

At this point, the video processor 41 begins a filling in process whereby it starts from a location somewhere within cell 606 and begins filling in memory locations associated or corresponding to cell 606 with gray scale values. Video processor first selects a black pixel, which is preferably centrally located within cell 606. Video processor 41 then "fills" the selected pixel and all adjacent black pixels with a half tone or gray value which is somewhere between the white and black values which are conventionally stored in memory.

This fill-in process continues until all pixels within cell 606 are filled with a half tone value. It is to be noted that if the half tone value reaches either a top 621 (FIG. 6) or bottom 623 of scan frame 600, the video processor has determined that it is measuring boundaries for cell 70 (FIG. 2) and channel 72. On the other hand, if the filled in pixels do not reach the top 621 or bottom 623 of scan frame 600, then video processor 41 regards the cell being measured as a highlight cell 76 (FIG. 2). If the half tones reach sides 625 and 627 of the screen, then video processor 41 determines that no cell is being measured.

For purposes of illustration, it will be assumed, as it was above, that video processor 41 is measuring a highlight cell 70 (FIG. 2) and 606 (FIG. 6) which was strobed by video camera 46 and strobed lamp 58. As video processor 41 completes filling in cell 606, it conventionally stores all black/white transition points and white/black transition points in memory.

After video processor 41 has completed filling in cell 600, the black/white and white/black transition points are located. These transition points generally correspond to the boundary lines or wall 606 (FIG. 6). The video processor 41 then examines these transition points and determines, by each horizontal scan line 602, the leftmost and rightmost (as viewed in FIG. 6) transition points. These transition points correspond to the points, like points 615 and 617 around the boundary of cell 606.

After all the boundary transition points have been determined, the maximum and minimum distances between transition points which lie on the same horizontal scan line 602 are determined. These values are conventionally subtracted by video processor 41, thereby resulting in values associated with the distance between the walls of highlight cell 606. Video processor 41 then scales these values to the pixel sizes of video camera 46 (FIG. 1).

In the illustration being described, and as viewed in FIG. 6, the largest difference between black/white and white/black transitions is at points 610a and 611a. The distance between these two points 610a and 611a represents the maximum separation distance, and consequently, the highlight width, HW. Video processor 41 determines that this is a highlight cell because no half tones reached the top 621 or bottom 623 of the scan frame 600.

It is to be noted that the channel width, CW, of channel 72 (FIG. 2) and cell width, BW, of cell 70 are determined in a similar manner by video processor 41. For example, the minimum distance determined by video processor 41 would correspond to the channel width, CW. If the video processor 41 determines that the minimum distance is below zero, then there is no channel and it is assumed a highlight cell, like cell 606 in FIG. 6, is being measured. As with the maximum distance, the minimum distance between black/white and white/black transitions which lie on the same line 602 are scaled to the magnification and pixel sizes of video camera 46 (FIG. 1).

Referring back to the illustration being described, once the highlight width, HW, has been measured, it is fed back to computer 34 and the error value E is determined. Computer 34 receives the highlight width HW and compares it to the HW corresponding to the predetermined set up parameters. If the error value E is below the predetermined threshold or zero, then no error adjustment is made to the predetermined setup parameters because the engraver is engraving highlight cells 76 (FIG. 2) having actual measurements which generally correspond to desired measurements prescribed by the predetermined setup parameters.

On the other hand, if the error value E is above the predetermined threshold, then an error adjustment is made. In this regard, computer 34 determines that the highlight cell 76 (FIG. 2) actually being engraved has dimensions which are different from the dimensions corresponding to the predetermined setup parameters. As mentioned earlier herein, computer 34 may use the most frequently occurring value of HW to determine the error value E. In this case, the error value E would represent the difference between the HW and the most frequently occurring value of HW which has been stored in memory for a plurality of highlight cells 76 which have been strobed and measured.

In the embodiment being described, computer 34 causes several measurements of the same size highlight cell 76 to be taken to verify the error value E. Computer 34 then adjusts one or more of the predetermined setup parameters BW, HW, CW, Vh, Ks, Vmax and S to account for the error value E.

FIG. 8 illustrates the measuring process according to this embodiment of the invention. The measuring process begins at start block 170 and proceeds to scan a frame of data at block 172. This is similar to the measuring process described above with respect to FIG. 7. After the scan frame of data is captured, the data is broken down into a plurality of localized sectors at block 174. Using a plurality of smaller localized sectors in this embodiment of the invention permits the video processor 41 and computer 34 to process data faster. Threshold points are determined for each localized sector. Thresholding is performed with each sector so that white/black and black/white transition points within that sector can be located. This process continues until all the black/white and white/black transition points are found for each sector in the scan frame and, ultimately, for the entire cell being measured at block 176. The video processor 41 begins the memory fill at block 180 by filling in all the black cavities for the cell being measured. Thereafter, the maximum and minimum transition points on a particular scan line are identified by video processor 41 at block 182.

At point 184, the video processor 41 checks to determine if the memory fill in has reached the sides 625 and 627 (FIG. 6). If it has reached sides 625 and 627, then video processor 41 determines that no cell or channel is being measured (block 186). If it has not reached sides 625 and 627, then video processor 41 determines if the fill in has reached top 621 or bottom 623 at point 188. If the top 621 or bottom 623 has been reached, video processor 41 calculates the channel width CW and cell width BW at block 190 using the maximum and minimum values determined at block 182. If the top 621 or bottom 623 has not been reached, then video processor determines the highlight cell width HW at block 192. After all the measurements have been determined, video processor exits at point 194, whereupon an error value E is determined by computer 34 in the manner described earlier herein.

Advantageously, this invention provides an error detection or error detector 101 and correction system suitable for providing a closed-loop system for engraving highlight cells 76 (FIG. 2), cells 70 and channels 72 in a gravure cylinder. The error detection and correction system permit an error value E to be determined and fed back to computer 34, whereupon feedback adjustments can be made to one or more of the predetermined setup parameters. This permits the gravure engraver to engrave actual cuts, cells and channels in accordance with predetermined setup parameters.

It is to be noted that this system may be used during initial setup or during the normal operation of the gravure engraver. Thus, the system and method described herein can provide "real time" display of the actual measurement and "real time" correction for any error value E.

Referring now to FIGS. 9–18, other embodiments of this invention are shown with common parts and components labeled with the same number, except that a prime mark ("'") has been added. Those components with the same number as in the embodiment described in FIGS. 1–8B have been identified with the same part number.

Figure 9:
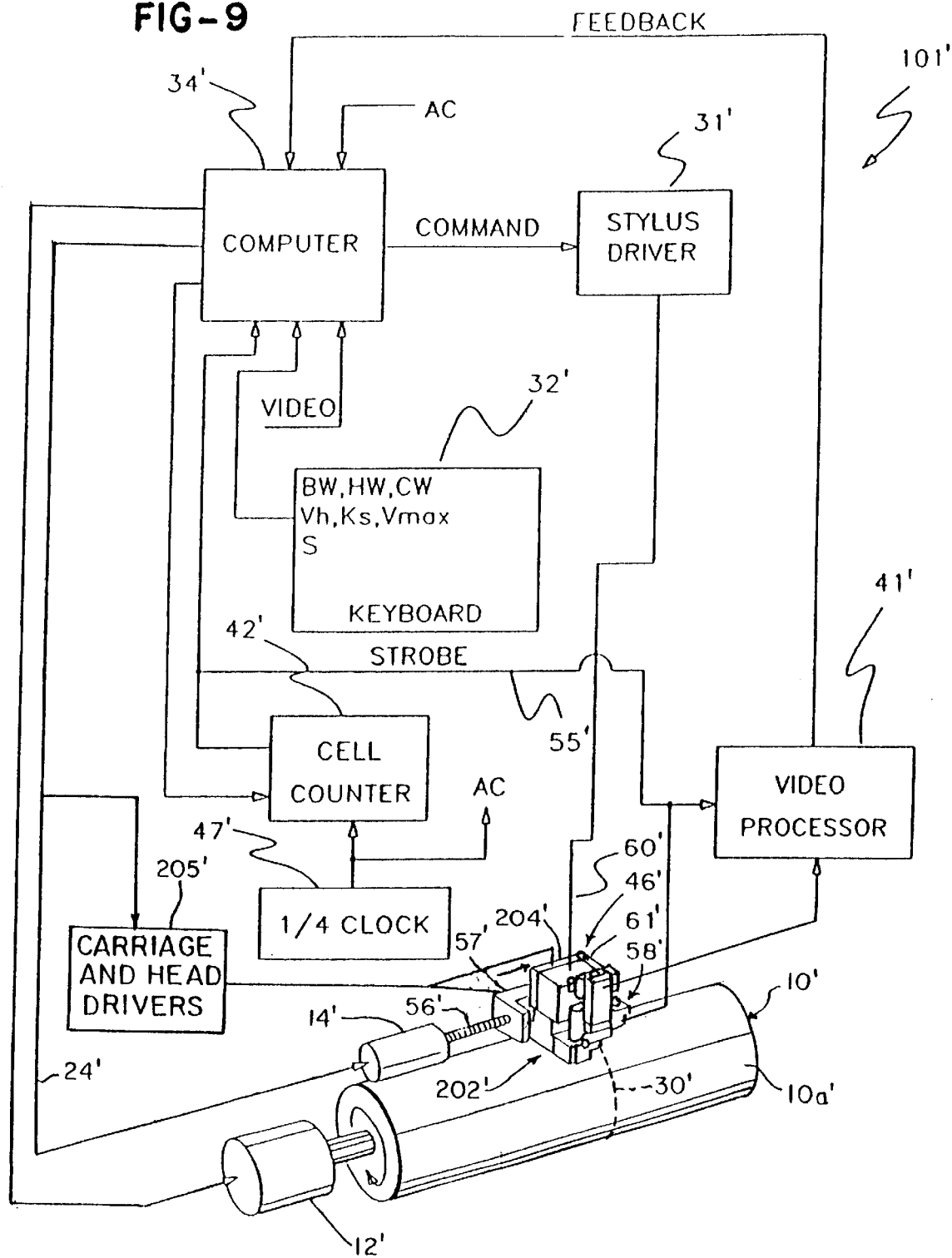
FIG. 9 is a schematic illustration, partly in perspective, of a programmable engraving system according to another embodiment of the invention.
Figure 10:
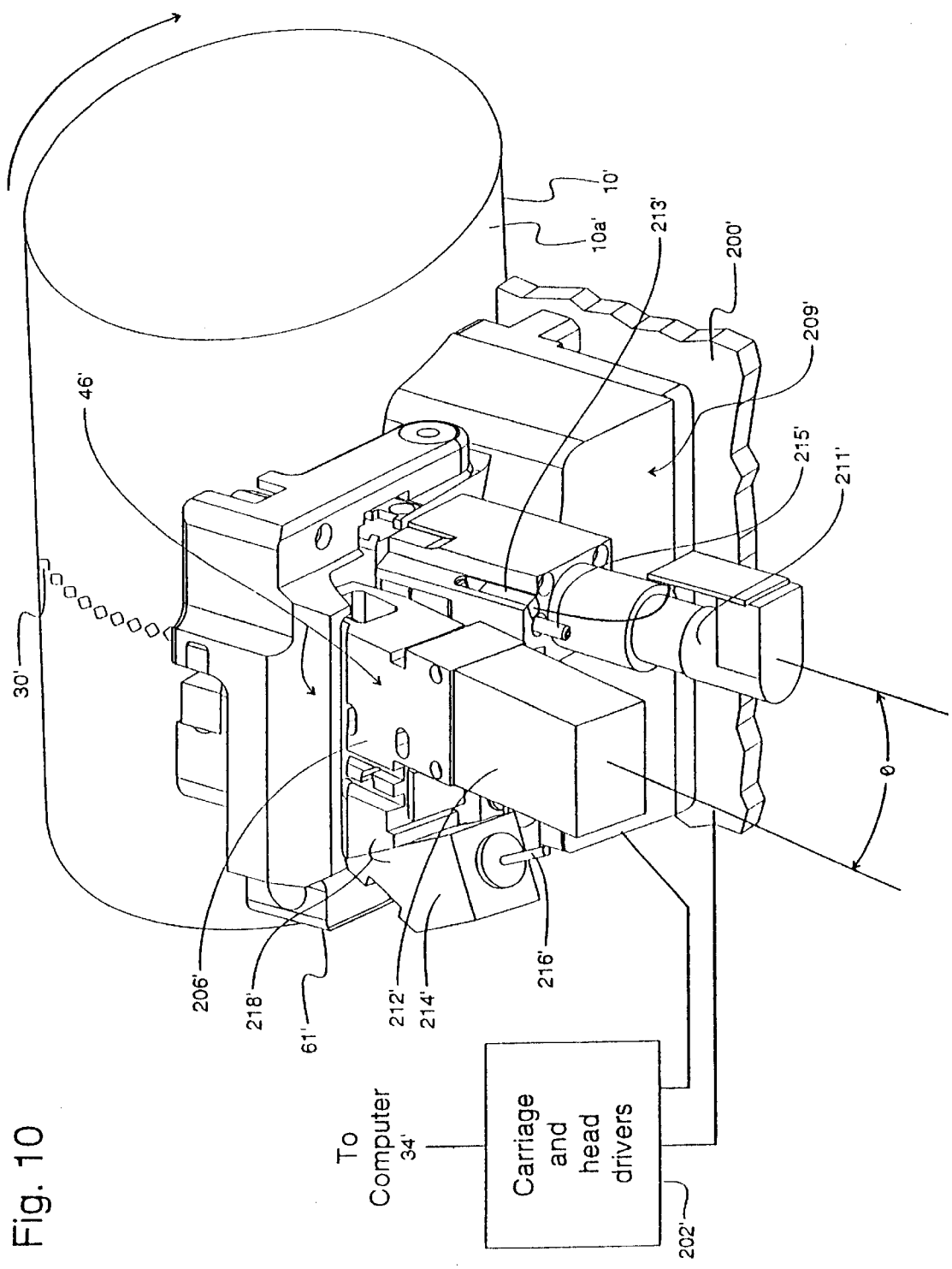
FIG. 10 is a perspective view showing details of various features of an engraving head used in the engraving system in another embodiment of the invention.

FIG. 10 is a rear of the engraving head 61' showing various features thereof. The engraving head 61' in FIGS. 9 and 10 is adjustably mounted on a support 200', such as of the type disclosed in Buechler, U.S. Pat. No. 4,450,486 referred to earlier herein. The engraving head may be mounted on a carriage 204' (FIG. 9) of the type described in U.S. patent application Ser. No. 08/091,302 filed Jul. 12, 1993, now issued as U.S. Pat. No. 5,454,306 which is assigned to the same assignee as the present invention and which is incorporated herein by reference and made a part hereof. The carriage 204' may then be mounted or coupled via a support 57' (FIG. 9) to leadscrew 56' which is in turn driven by leadscrew drive motor 14' in response to a drive signal from computer 34' in order to drive the engraving head radially across a surface 10a' of cylinder 10'.

The apparatus may comprise carriage and head drivers 205' (FIGS. 9 and 10) for driving carriage 204' on support 57' and also for driving engraving head 61' toward and away from surface 10a' in order to effect engraving thereof. As with the embodiment described earlier herein, this embodiment comprises videoing means or imager 46' for viewing a portion of track 30' of an engraved area on cylinder 10'.

Referring now to FIG. 10, the engraver comprises the engraving head 61' for engraving the cylinder surface 10a' of cylinder 10'. The engraving head 61' is adjustable mounted on the adjustable support 200' which may be coupled to suitable drivers 205' which are capable of driving engraving head 61' and imager 46' towards and away from cylinder 10'.

As illustrated in FIG. 10, the imaging means, imager or image system 46' comprises a camera 206' having a lens 208' capable of automatically focusing on the surface 10a' of cylinder 10'. In the embodiment being described, the camera 206' comprises a depth of focus of about 3 microns. It should be noted that it is generally preferable to have the stylus 20' (FIG. 11) engage the cylinder 10' at an angle which is substantially perpendicular to the surface 10a'. Notice in FIG. 11 that the lens 208' of camera 206' of image system 46' is positioned directly above the stylus 20' and substantially in line with stylus 20' in order to facilitate imaging the track 30' of actual cuts or cells soon after they are engraved on surface 10a' of cylinder 10'.

The imager 46' may comprise at least one adjustable tilt support (FIG. 10) for adjustably supporting the camera a predetermined tile angle θ (FIG. 10). The angle θ represents the tilt of the camera and may be varied depending on the diameter of the cylinder 10'. For example, the adjustable support may comprise an adjustable bracket (not shown) or camera shroud (not shown) for adjustably supporting the camera 206'. In this embodiment, the angle θ is on the order of about 8–13 degrees for a 10' having a diameter of about 6–8 inches.

The imager 46' also comprises a driver 212' for driving the lens 208' (FIG. 11) towards and away from cylinder 10'.

The imager 46' also comprises an illuminator 214' (FIG. 10) which is capable of illuminating surface 10a' of cylinder 10' to a plurality of light intensity levels. In the embodiment being described, the plurality of light intensity levels varies from about 0 lux to about 100 lux. The illuminator 214' comprises the strobe 58' and fiber optic input 216' which cooperates with imager 46' to strobe flashes through an optical assembly and prism arrangement 218', thereby enabling the strobe 58' to flash through the lens 208' (FIG. 11) of camera 206' as referred to in the embodiment described earlier herein.

Figure 12:
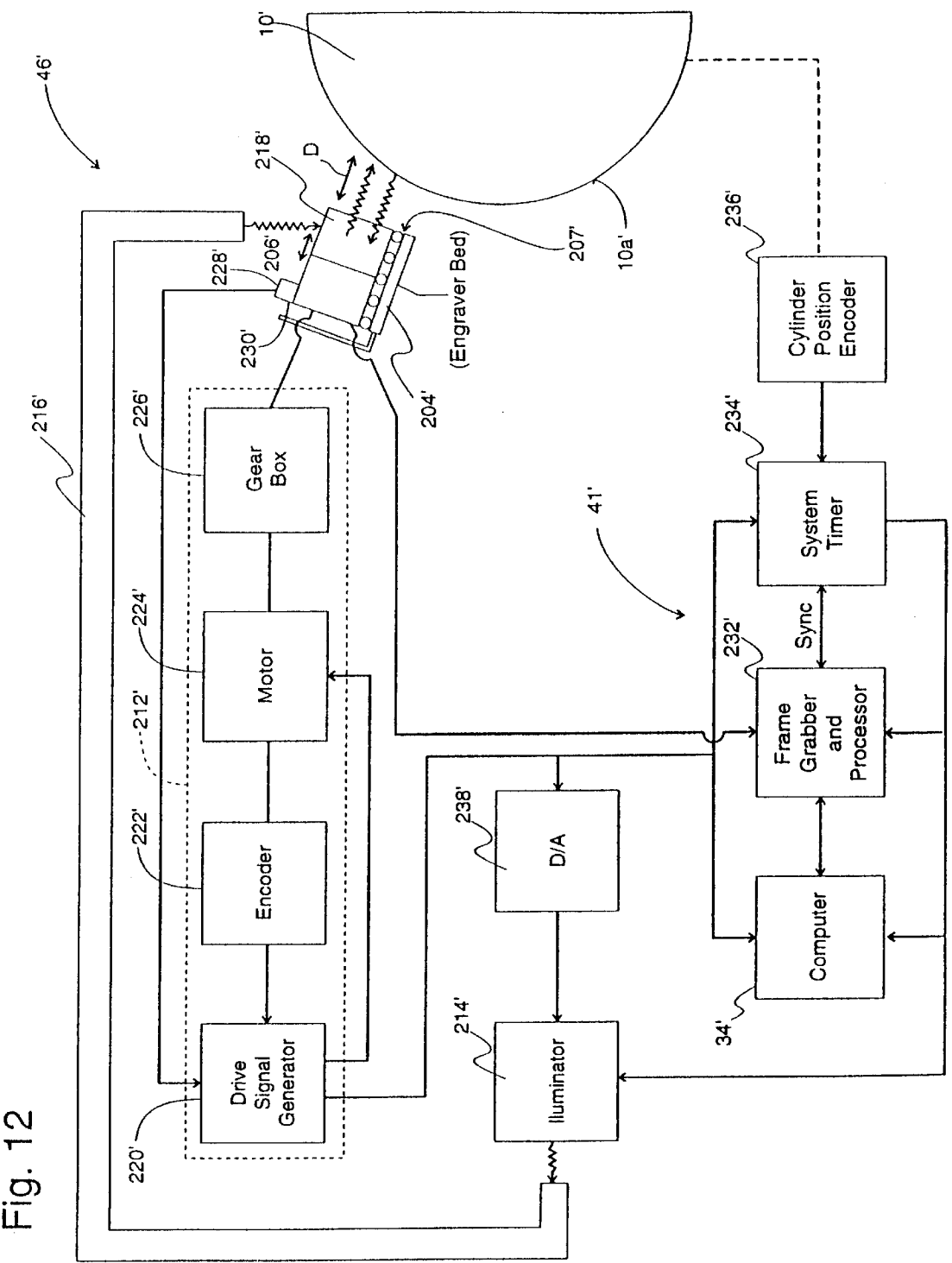
FIG. 12 is a schematic illustration of an imager or imaging system in accordance with another embodiment of the invention.

Referring now to FIG. 12, a general schematic of the imaging system 46' is shown. As illustrated, the driver 212' comprises a drive signal generator 220' coupled to an encoder 222' which is coupled to a motor 224'. The driver 212' further comprises a gear box 226' which couples motor 224' to camera 206' for driving camera 206' towards and away from cylinder 10' in response to motor 224'. The imager 46' also comprises a proximity sensor 228' which is coupled to drive signal generator 220' and which cooperates with a target 230' to generate a position signal corresponding to a position of camera 206' relative to surface 10a'.

As illustrated in FIG. 12, the imager 46' comprises a frame grabber and processor 232' which is coupled to computer 34' and system timer 234' for timing and synchronizing the illumination and capturing of images on cylinder 10'. In this regard, imager 46' also comprises a cylinder positioned encoder 236' coupled to system timer 234' for determining a position of cylinder 10'.

Notice that the computer 34' is coupled to drive motor signal generator 220' and to digital-to-analog converter 238', which is also coupled to illuminator 214' as shown.

Figure 11:
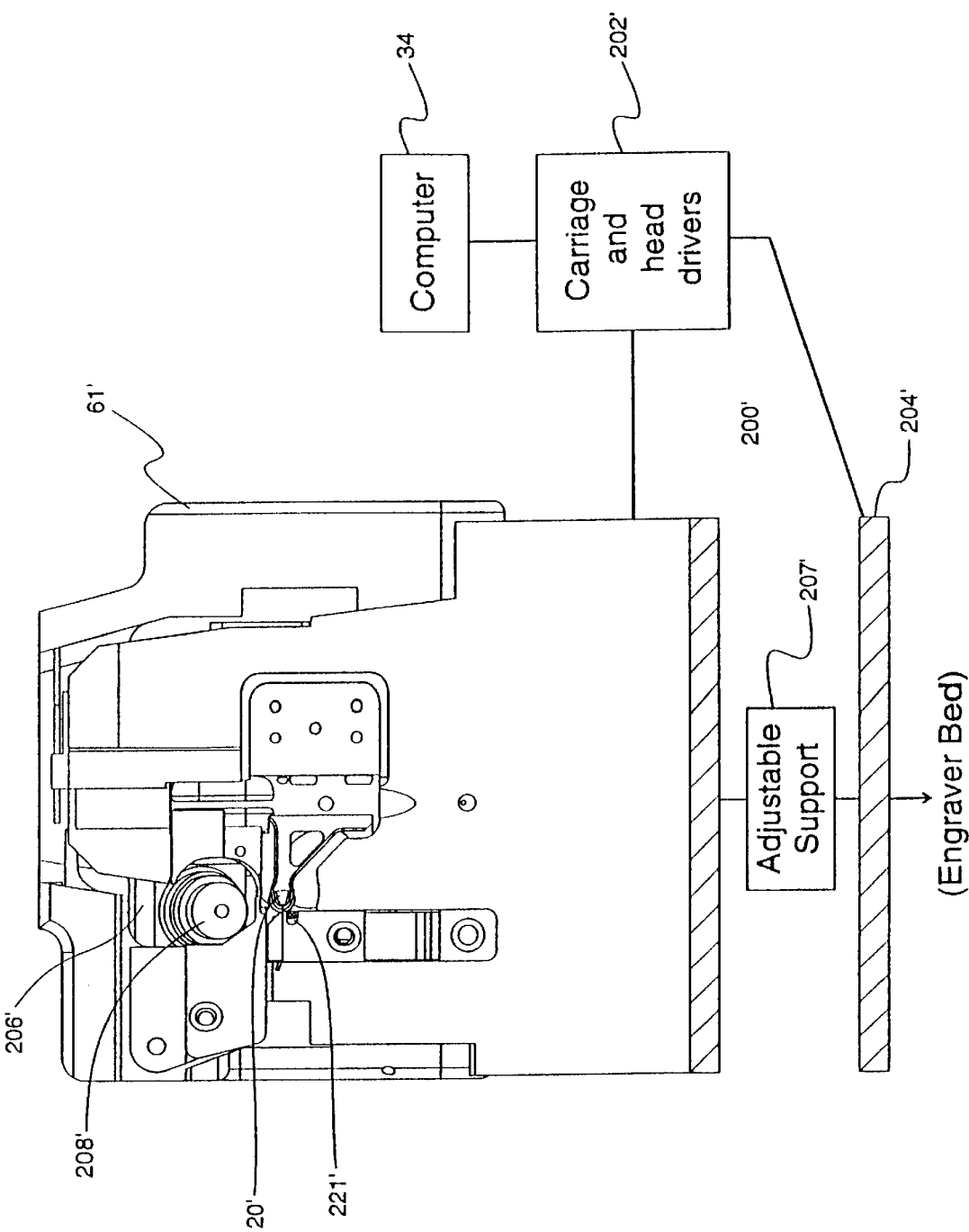
FIG. 11 is a front view of the engraving head shown in FIG. 10.

The engraver 10' also comprises an adjustable shoe system or means 209' and method for adjusting a shoe 221' (FIG. 11). The shoe system 209' comprises a shoe driver 211' which is coupled to computer 34'. A shoe proximity sensor 213' is conventionally coupled to computer 34' and cooperates with a target 215' to facilitate determining the position of the shoe 221' relative to stylus 20'. It should be appreciated that shoe driver 211' may also comprise an encoder (not shown) for further facilitating determining the position of the shoe 221' relative to the stylus 20' and/or cylinder 20'.

Figure 13:
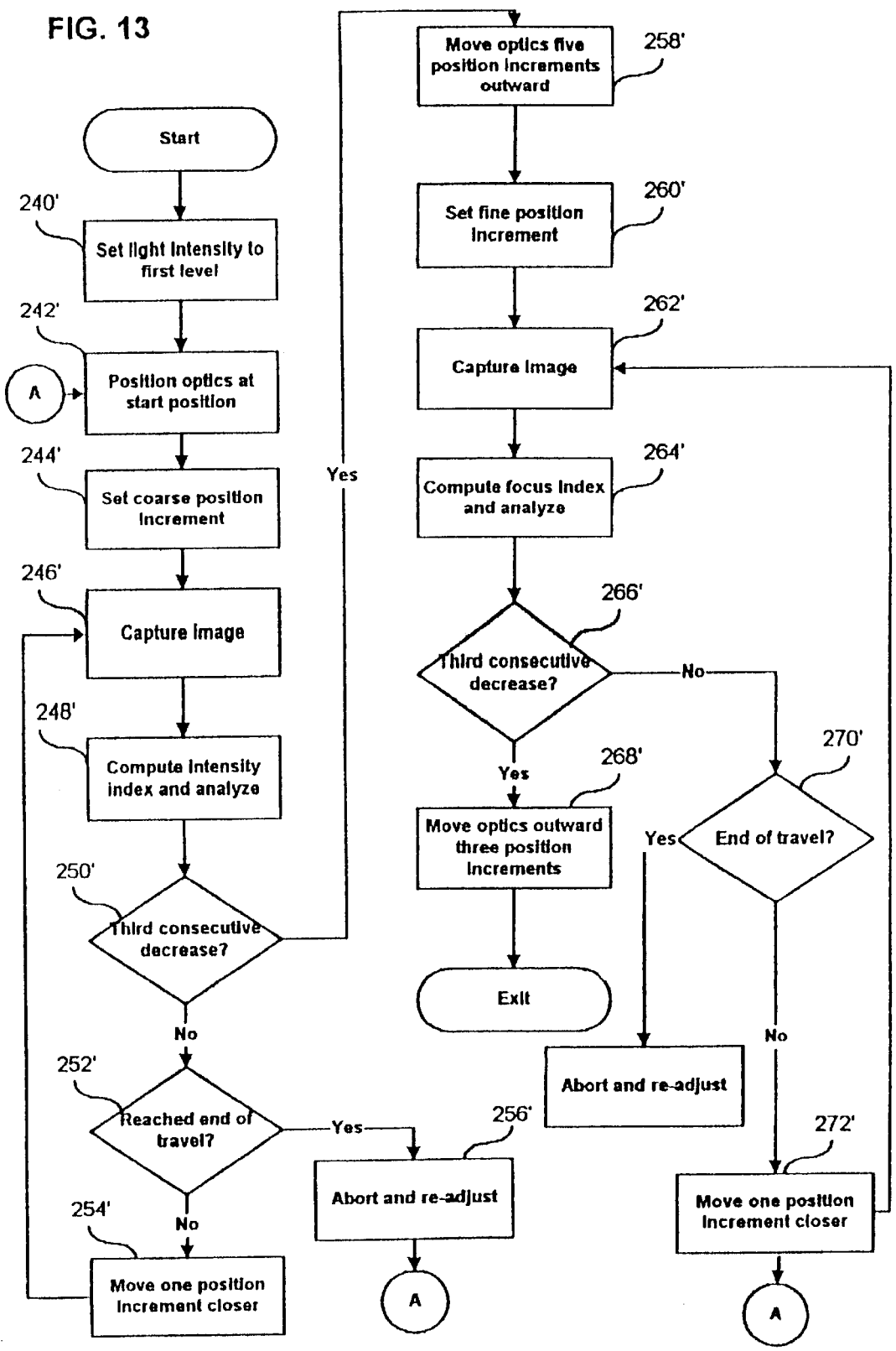
FIG. 13 is a flow chart illustrating an automatic focus and imaging method in accordance with another embodiment of the invention.

The method for automatically focusing camera 206' is described in relation to FIG. 13. In the embodiment being described, the method may be programmed, for example, into computer 34' and/or video processor 41' (FIG. 1). The method starts at block 240' where illuminator 214' is set to a first predetermined intensity level. In the embodiment being described the first predetermined intensity level may be about 55–65% of a maximum light intensity level of illuminator 214' or about 15 lux. The method proceeds at block 242' where the camera 206' is positioned at a start distance or position away from surface 10a'. The start position is generally outside the actual focus distance or position of the camera 206' described below. At block 244' a coarse position increment is set and then an image is substantially simultaneously illuminated and captured by illuminator 214' and camera 206' (block 246').

Figure 14:
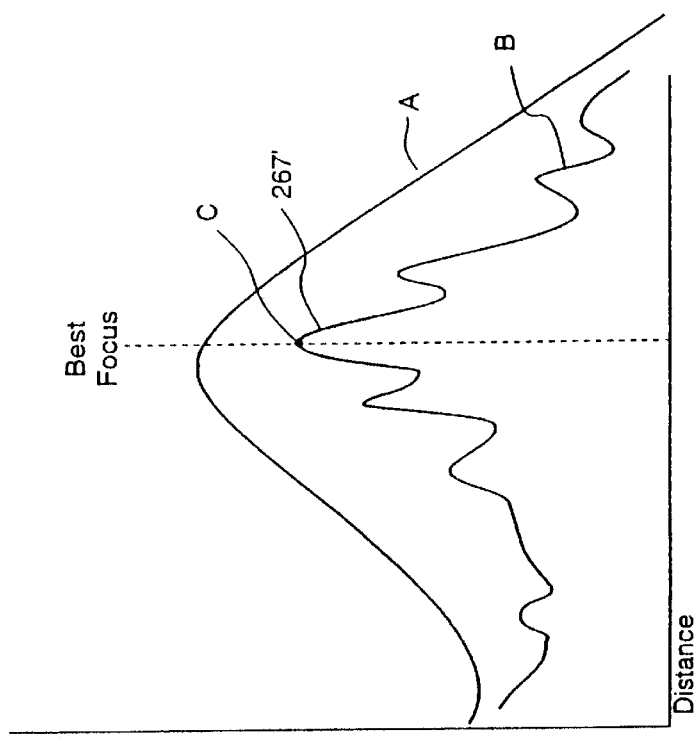
FIG. 14 is a graphical plot of an intensity index, focus index and best focus position.

At block 248', computer 34' computes, analyzes, or generates an intensity index and then stores the intensity index. The intensity index corresponds to an average light intensity and is represented by graph A in FIG. 14. The distance D typically ranges from 0 to 5 mm. Also, it should be noted that the maximum of the intensity index may differ from the best focus position by about 5 to 30 micrometers. In this regard and as graphically illustrated in FIG. 14, it has been found that the intensity index or average light level has a peak or maximum value which is normally not coincident with a best focus position C of camera 206', but is located near that best focus position. It has also been found that the intensity index normally has a smoother variation as the distance between the camera 206' and surface 10a' of cylinder 10' changes. Thus, as best shown in FIG. 14, the intensity index generally has a broader peak when compared to a focus index (represented as graph B in FIG. 14). In general, the focus index represents the high frequency content of the image.

It has been found that by utilizing the intensity index, a gross or coarse focus may be quickly achieved. Subsequently, the focus index may be used to find the best focus position which generally corresponds to the maximum (FIG. 14) or the highest peak C of focus index B. Advantageously, the high frequency content or focus index curve B generally provides a best focus position at the global maximum of the high spatial frequency content. However, there are a number of local maxima. Accordingly, it has been found that using the intensity index for coarse adjustments greater than the depth of focus of camera 206' and the focus index for fine adjustments less than the depth of focus is desirable.

Computer 34 analyzes the intensity index (block 248' in FIG. 13) at that position of camera 206' and, if a third consecutive decrease in the intensity index is realized (decision block 250'), then the method proceeds to a fine or actual focus distance adjustment as described below. If the decision at decision block 250' is no and the camera 206' and gearbox 226' (FIG. 12) have not achieved an end of their travel, then drive signal generator 220' energizes motor 224' to position camera 206' at least one position increment closer to surface 10a' of cylinder 10'. If gearbox 226' and camera 206' have reached the end of their travel at decision block 252', then the routine aborts and the camera position may be adjusted, for example, by moving carriage 204' further from cylinder 10.

If there is a third consecutive decrease at decision block 250', which would generally indicate a position on a decreasing slope of the intensity index curve, then the drive signal generator 220' (FIG. 12) energizes motor 224' to drive gearbox 226' such that camera 206' moves several position increments outward or backward away from cylinder 10'. In the embodiment being described, the motor 224' is energized to cause camera 206' to be moved or stepped backward approximately five position increments. The position and/or travel of the camera 206' is sensed or determined utilizing encoder 222', proximity sensor 228' and target 230'. After camera 206' is moved at block 258' (FIG. 13), a fine position increment is set at block 260'. In the embodiment being described, the fine position increment is set at about 0.4 microns.

The routine continues to block 262' where an image is captured by camera 206'. The focus index for that position of camera 206' is computed, analyzed and stored in suitable memory (block 264'). A third consecutive decrease (decision block 266') would indicate that the camera 206' has been indexed to a position, such as position 267' in FIG. 14, which is forward of the best focus position by approximately three position increments. In this event, the camera 206' is then driven outwards or backwards away from the cylinder 10' approximately three position increments (block 268' in FIG. 13). This causes the camera 206' to be positioned at or very close to the best focus position C (FIG. 14) where the imager 46' can achieve best focus results.

If there is not a third consecutive decrease at decision block 266' (FIG. 13), then it is determined at block 270' whether the driver 212' (FIG. 12) has reached the end of its travel. If it has not, then drive signal generator 220' (FIG. 12) causes camera 206' to be moved one position increment closer to cylinder 10' (block 272', FIG. 13). If the camera 206' has reached the end of its travel at decision block 270', then the routine is aborted and the imager 46' may be readjusted, for example, by adjusting the position of the engraving head 61' or carriage 204' before the routine loops back to block 242' for a new start position.

After the best focus position C (FIG. 14) has been located (block 268') and the imager 46' is set, locked or adjusted accordingly, the routine exits.

It may be desirable to set-up, scale or calibrate the light intensity used in the imager 46' using a maximum dynamic illumination range possible using camera 206' and frame grabber 232'. Stated another way, it is preferable to operate or scale the data for an image captured by camera 206' and frame grabber 232' such that they operate with the maximum number of gray scale levels so that any captured image contains details on all levels in the gray scale (i.e., on the lowest lows and the highest highs). Accordingly, an automatic pixel array calibration system and method comprising a light calibrator or calibration routine 300' (FIG. 15) is provided and may be resident, for example, in computer 34' and/or video processor 41' for calibrating the imager 46' to provide maximum detail for each captured image. The light calibrator comprises a light calibration processor which may be resident in computer 34', video processor 46' or frame grabber and processor 232' (FIG. 12).

In general, the frame grabber (FIG. 12) comprises conventional gain and offset controls (not shown) which may be adjusted to control an analog output of camera 206'. The frame grabber and processor 232' is suitable for converting the analog output of camera 206' into a 512 by 480 (X/Y) spatial array of CCD elements or pixel intensities whose amplitudes vary from 0–255. This array of data provides the feedback needed by computer 34' and video processor 46' for providing closed-loop, real-time, automatic setup, scaling and/or calibration.

Figure 15:
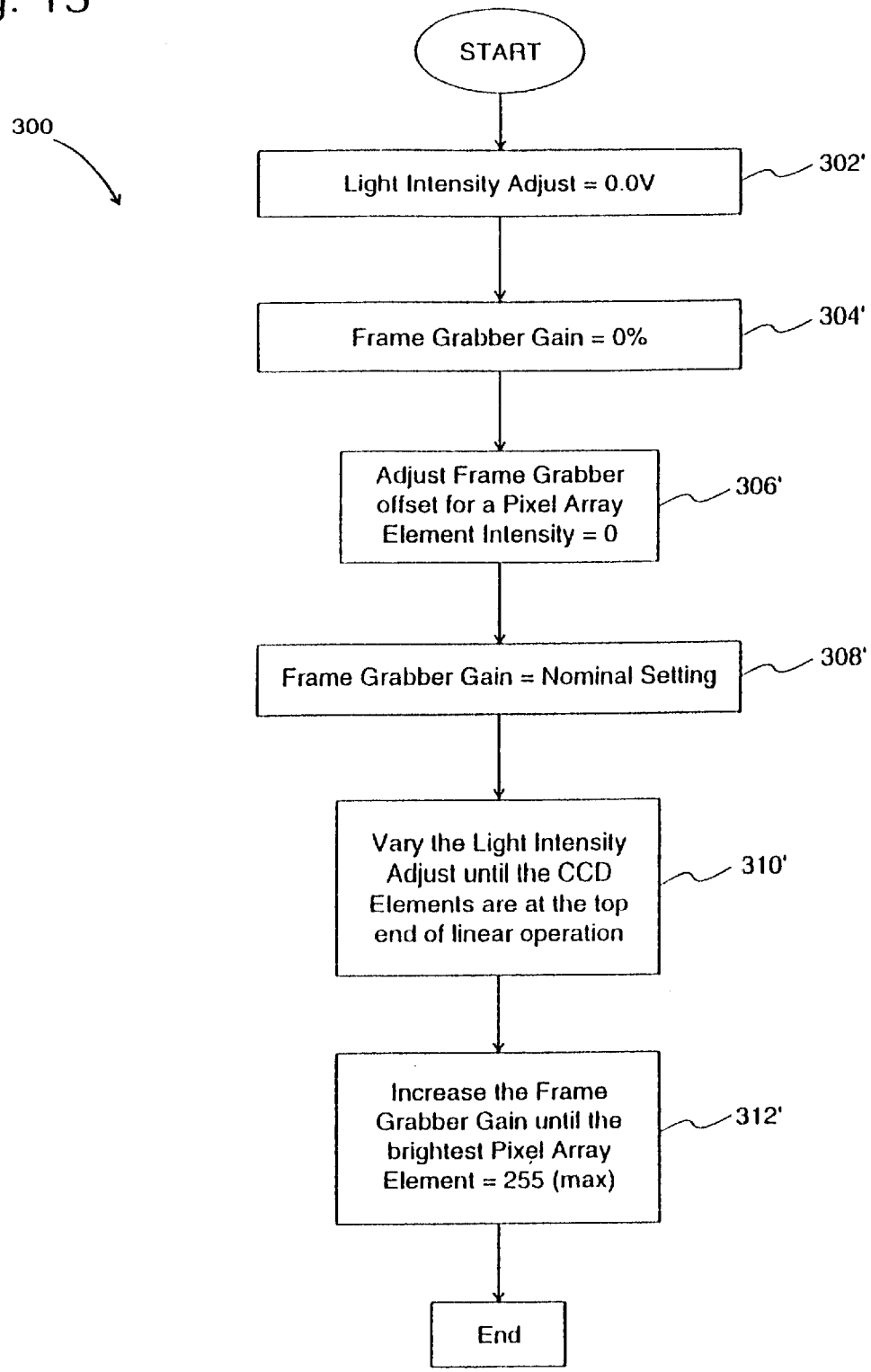
FIG. 15 is a schematic illustration of a light calibrating method.

Referring to FIG. 15, the imager 46' is set so that there is no light (block 302') by adjusting a gain control on frame grabber 232' to zero percent (block 304'). At block 306', an offset control on frame grabber 232' is adjusted for a captured pixel value equal to zero, and then the frame grabber 232' gain is set to the nominal setting (block 308'). At block 310', the light intensity of illuminator 214' is varied or adjusted until CCD elements of frame grabber 232' are at a maximum end of their linear operation, and preferably, just before they are saturated. At block 312' the gain of frame grabber 232' is adjusted until the brightest CCD pixel element equals 255 maximum (block 312'). Thereafter, the routine exits and the illuminator 214' is scaled or calibrated to provide the maximum captured pixel value in the captured image to be near 255 (on a scale of 0 to 255).

In the embodiment being described, it is preferable to calibrate the light intensity such that the lowest intensity is between 0–50 on a scale of 255 and a maximum intensity of between 240 and 255 to ensure that the intensity level of all areas of the captured image fall between 0 and 255 and span the maximum possible dynamic range.

Advantageously, scaling or calibrating in the manner described herein facilitates automatic illumination adjustment and also provides closed-loop and real-time gray scaling for captured images. This also facilitates taking measurements and correcting or adjusting for measured errors.

Figure 17:
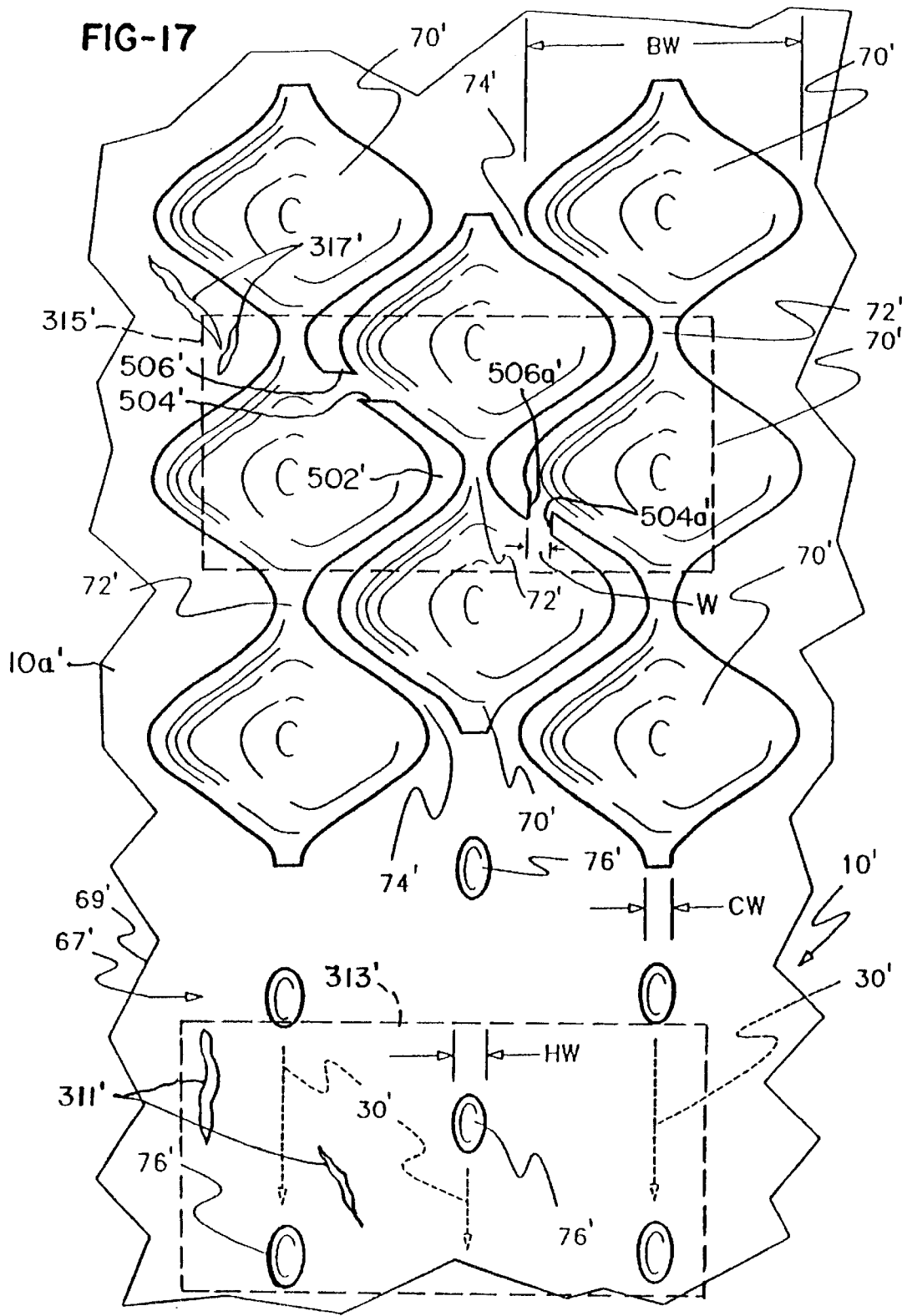
FIG. 17 is a partly broken away schematic illustration of a series of engraved cells and also showing some gaps in a cell wall and a discontinuing in the form of a scratch that may appear in a surface of a cylinder.

It has been found that auto focusing may best be achieved by observing or focusing on a focus area 313' comprising imperfections or discontinuities, such as scratches 311' and 317' in FIG. 17, in surface 10a' of cylinder 10'. It has also been found focusing may be best achieved by focusing on the focus area 313' at a first predetermined light intensity level. Subsequent imaging of images may be enhanced by imaging a portion of cylinder 10', such as portion 315', which includes an actual cut, cell or highlight cell at a second predetermined light intensity level which is higher than the first predetermined light intensity level. In the embodiment being described, it is preferable, for example, to set the first predetermined light intensity level of illuminator 214' at less than 20 lux (e.g., at 15 lux) and the second predetermined light intensity level of illuminator 214' at greater than 20 lux. The first predetermined light intensity may be 55–65 percent of a maximum possible intensity, while the second predetermined light intensity may be on the order of about 95–100 percent of the maximum possible intensity.

Increasing the light intensity level of illuminator 214' during the measuring process described earlier herein facilitates, for example, drowning, scratches, imperfections and discontinuities in the surface 10a', thereby improving the probability of a successful measurement and error correction of, for example, cells 70 located in the portion 315'. In contrast, lowering the light intensity level during autofocusing facilitates increasing contrast of the images of scratches, imperfections and discontinuities in surface 10a', thereby improving the probability of successfully autofocusing camera 206 on surface 10a' of cylinder 10'.

The system and method of the present invention also comprises a discontinuity locator 400' (FIG. 16) or means for locating at least one discontinuity in the array of data corresponding to the image captured in either the focus area 313' or portion 315'. This is particularly useful when removing data corresponding to any discontinuities, such as scratches 317' in portion 315' (FIG. 17) and scratches 311' in portion 313', or other imperfections resident in surface 10a' of cylinder 10'. In this regard, the discontinuity locator 400' comprises an identifier resident, for example, in either video processor 41' or computer 34' for identifying any such discontinuous data in the array of data corresponding to the discontinuity and also for processing the discontinuous data to electronically eliminate the discontinuity from the array of data. This, in turn, facilitates more accurately measuring, error correcting and engraving in accordance with this invention.

In the embodiment being described, the captured pixel image array is analyzed to generate a chord table (not shown) in a manner known as run length encoding. The chord table organizes the chords by row, and typically from left to right within each row. Each chord entry in the table consists of a starting column and ending column of the chord, or alteratively, vertical chords may be organized such that the table consists of a starting row and an ending row of each chord. The encoded chords may represent either the white or dark pixels of the binary image in the data array as desired. In the method described herein, each chord is assigned a label which is unique to a segmented region. Computer 34, frame grabber and processor 231' and/or video processor 41' may comprise the identifier for identifying any undesired image data corresponding to at least one undesired image or discontinuity, such as a scratch in the array of data. They may also comprise an image eliminator for eliminating the undesired image data or discontinuous data corresponding to the undesired image from the array of data.

Figure 16:
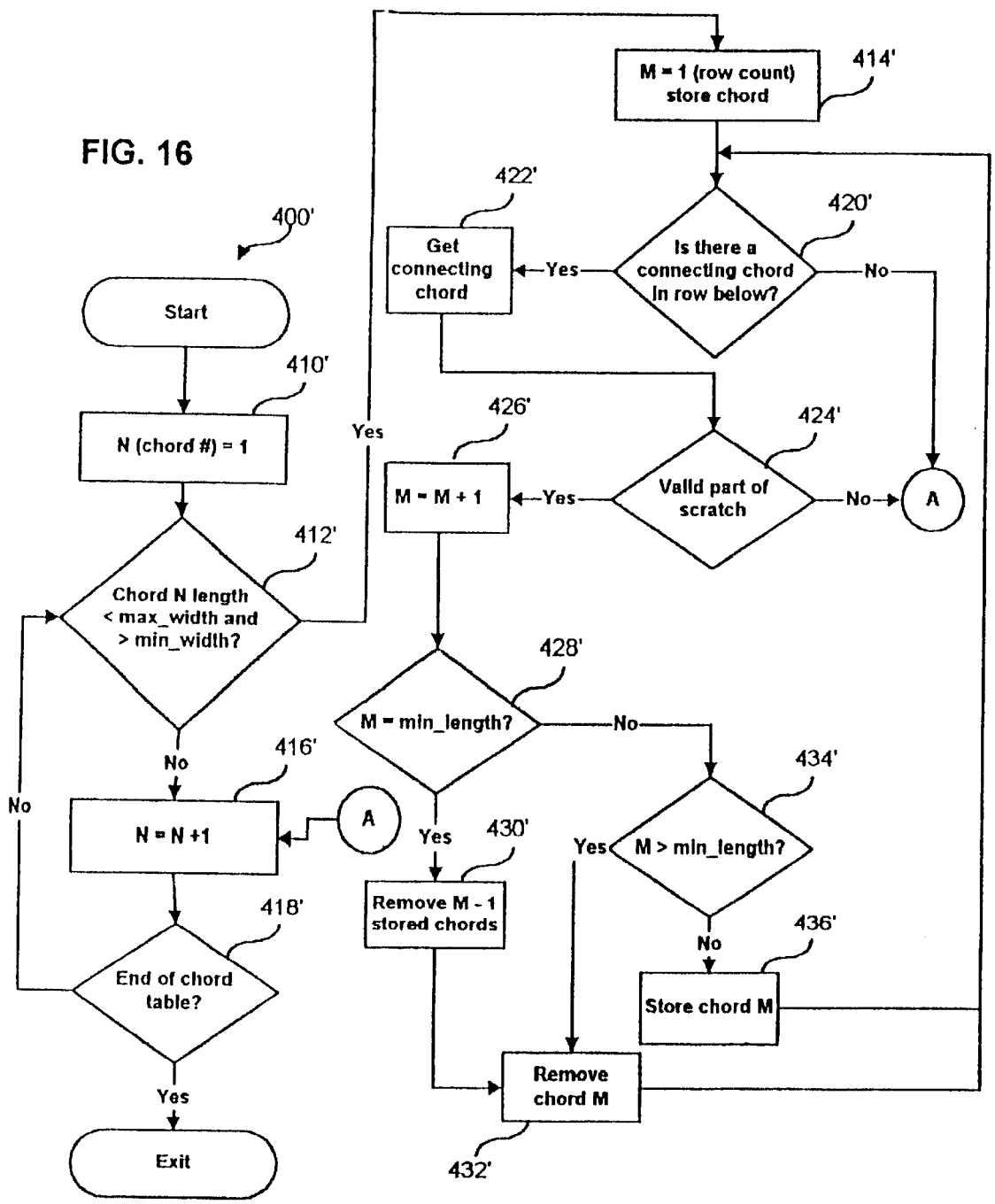
FIG. 16 is a schematic illustration of a discontinuity locator and method for locating and removing data corresponding to discontinuities in the image of data.

Initially, an array to data corresponding to a captured image, (such as an image of portion 315' in FIG. 17) is analyzed, for example, by computer 34' and a chord table (not shown) of chords (not shown) corresponding to the undesired image is generated. Referring now to FIG. 16, the discontinuity locator 400' begins at block 410' where a chord number N is set equal to 1. At decision block 412', it is determined whether the length of the chord N is less than a maximum width, max_width, and greater than a minimum width, min_width. If it is, then the routine proceeds to block 414' where a row counter or pointer M is set equal to 1 and the chord N is stored in suitable memory (not shown). If the answer at decision block 412' is negative, then N is incremented by 1 (block 416').

At decision block 418', it is determined whether the end of the chord table has been reached. If it has, then the routine exits and no elimination or no further elimination of any of the chords in the chord table is performed by the image eliminator. If, on the other hand, the end of the chord table has not been reached then the routine loops back to decision block 412' as shown.

If the answer at decision block 412' is yes, then the routine identifies any undesired image data corresponding to the undesired image in the array of data and subsequently may eliminate that undesired image data from the array of data as follows. At decision block 420', it is determined if there is a connecting chord in a row in the chord table immediately below the row in which the stored chord appears.

If there is not, then the routine loops back to block 416' where the chord number N is incremented by one as shown. If there is a connecting chord, then the routine proceeds to block 422' and computer 34', frame grabber and processor 232' and/or video processor 41' retrieves the connecting chord from memory. If the connecting chord is a part of the undesired image data corresponding to an undesired image, such as the scratch 317' in portion 315' (FIG. 17), then the row count M is incremented by 1 (block 426'). If the connecting chord is not part of the undesired image scratch, then the routine loops back to block 416' as shown. At decision block 428' it is determined whether the row count M is equal to a minimum length.

If the answer at decision at block 428' is yes, then the routine proceeds to remove the chord or chords located at row count M−1 (block 430') and, thereafter, removes chord M (block 432'). The routine then loops back to decision block 420' as shown. If the decision at block 428' is negative, then it is determined whether the row count M is greater than the minimum length. If it is, then it removes the chord M at block 432' and then loops to decision block 420'. If the decision at block 434' is negative, then computer 34' stores the chord or chords at row count M (block 436') and then loops back to decision block 420'.

In the embodiment being described, the min_width is two pixels, and the max_width is ten pixels and the min_length is six pixels and a typical array of data size is 512 pixels by 240 rows.

Advantageously, this routine provides a means or process and image eliminator system and method for eliminating undesired image data located in the array of data. This further facilitates more accurate imaging, measuring, error correcting and engraving desired patterns on surface 10a' of cylinder 10'. In addition, it should also be appreciated that the apparatus, method and system of this invention could be used to eliminate image data corresponding to intentionally engraved areas, such as channel 72', which were cut or engraved into the surface 10a' of cylinder 10'.

Figure 18:
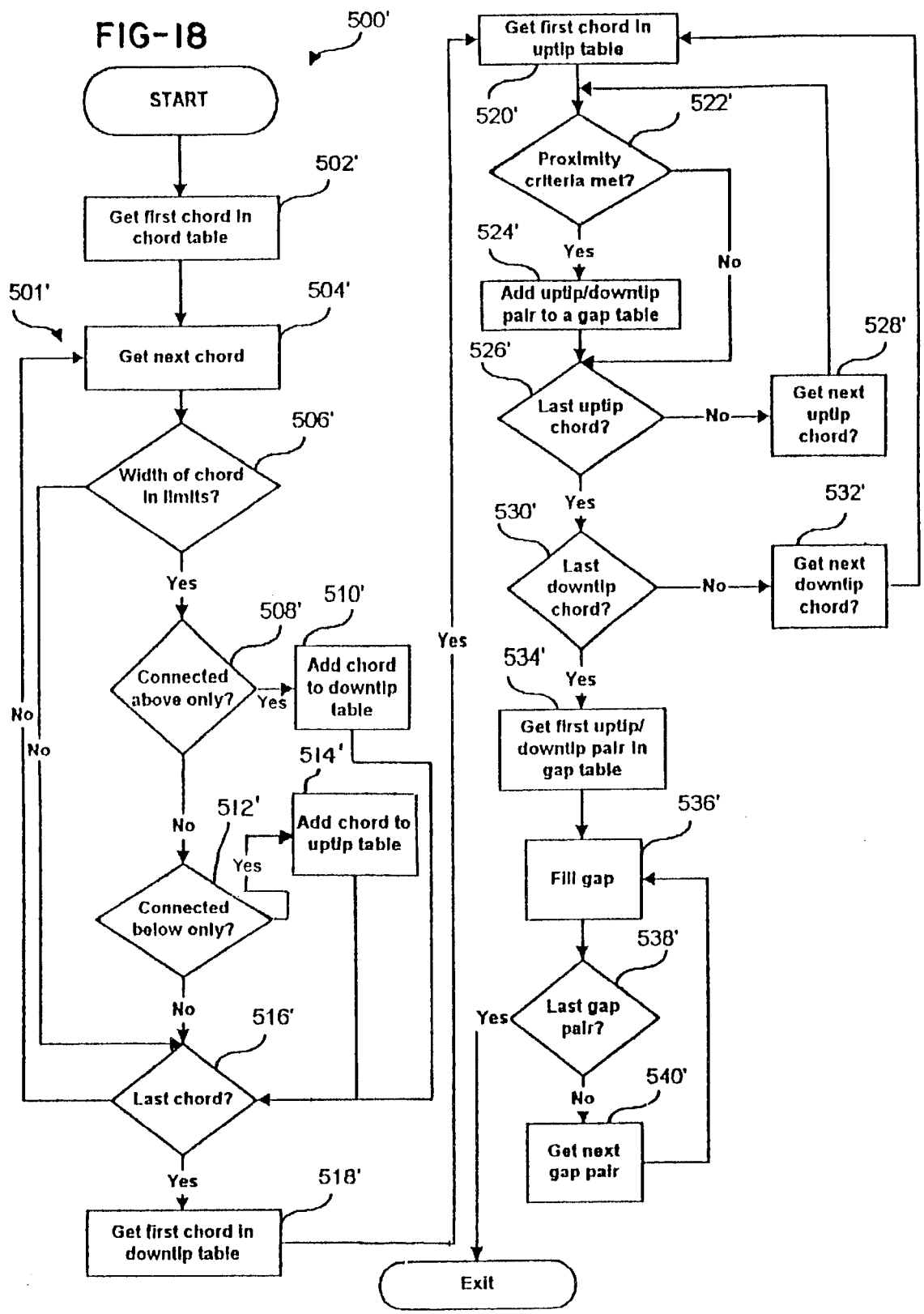
FIG. 18 is a schematic illustration of filler routine for filling in continuous data into an array of data.

The apparatus, system and method of the present invention also provides effective means for filling in or generating data to fill in gaps or discontinuities in the array of data using a filler method or routine 500' (FIG. 18). As illustrated in FIG. 17, several types of gaps in a captured image may appear which makes it difficult to generate a continuous or complete array of data, thereby making it difficult to accurately focus and measure areas on surface 10a'. In the embodiment being described, computer 34' frame grabber and processor 231' and/or video processor 41', for example, comprise the filler routine 500', discontinuity locator and identifier for locating the gap or discontinuity in the image or image data, for identifying discontinuous data in the array of data corresponding to the discontinuity, and also for processing the discontinuous data to eliminate the discontinuity therefrom. This also facilitates eliminating the discontinuity so that error correcting and engraving can be more easily achieved.

In the embodiment being described, these gaps may correspond to actual gaps in an engraved pattern or gaps or discontinuities associated with imaging the engraved pattern when imaging the portion of surface 10a' and cylinder 10'. As illustrated in FIG. 17, when a wall, such as wall 502', is breached, an uptip 504' and downtip 506' may be created such that the uptip 504' is above the downtip 506'. However, a situation can arise where an uptip 504a' is actually situated above the downtip 506a'.

In general, the filling or closing routine, system or method of the present invention uses an array of data associated with the captured image to generate a chord table (not shown) of chords (not shown). The chord table is scanned and processed to identify and categorize generate and define uptips into an uptip table (not shown) and downtips into a downtip table (not shown) after it has been determined that there is a gap. In general, the gap filling or gap-closing process involves either dividing the chords into pairs of non-touching chords for gaps of the type shown between uptip 504' and downtip 506,' or for chord pairs comprising an uptip 504a' or downtip 506a', lengthening a white chord width W (FIG. 17) by changing either its start position or end position.

Once a discontinuity or gap is located, the uptip table and downtip table are used to determine any uptip and downtip pairs that fall within a predetermined gap tolerance level or range. Those gap pairs falling within the predetermined gap tolerance range are subsequently put into a gap table. Computer 34', for example, may use the gap table to remove or "fill in" any discontinuities or gaps, thereby providing continuous data in the chord table and the array of data so that imaging, measuring, real time and closed loop error correction, and engraving of actual cuts or engraved cells may be enhanced. It should be appreciated that the gaps may be the result of, for example, broken cell walls or even poor illumination or image capturing.

Referring now to FIG. 18, the process or method proceeds by obtaining a first chord from the chord table (block 502') and a next chord (block 504'). It is to be noted that the discontinuity locator 400' processes black chords or chords which may correspond to engraved areas on cylinder 10', while the gap filling routine 500 processes white chords or chords which may correspond to non-engraved areas. At decision block 506', it is determined whether the width of a white chord, for example, is within a predetermined width or limits. In the embodiment being described, this predetermined width ranges between approximately 2 to 30 pixels. If it is, then it is determined whether the chord in the chord table is connected only to a white chord, for example, immediately above it (decision block 508'), and, for example, is not connected to a white chord below it. If it is, then computer 34' or video processor 41' adds that chord to a downtip table (not shown) at block 510'. Thereafter, the routine proceeds to decision block 516' as illustrated.

If the decision at decision block 508' is negative, then it is determined (decision block 512') whether the chord is connected in the chord table to another white chord directly below it only. If it is, then that chord is defined as an uptip chord and added to an uptip table (not shown) at block 514'. After that, or if the decision at decision block 512' is negative, then the process proceeds to decision block 516' where it is determined whether the last chord in the chord table has been analyzed. If it has not, the routine loops back to block 504'. If it is the last chord in the chord table, then all the chords in the chord table have been processed and analyzed and, where appropriate, separated either into the downtip table or uptip table which are now ready for further processing.

At block 518', the first chord in the downtip table is obtained, and the first chord in the uptip table is obtained at block 520'. The routine proceeds to decision block 522' where it is determined if the first chord in the downtip table and the first chord in the uptip table are within a predetermined proximity with respect to each other. In the embodiment being described, if the uptip and downtip pair are of the type illustrated by uptip 504' and downtip 506', then the predetermined proximity may be a vertical limit which may be set at, for example, 15 rows. If the uptip and downtip pair are of the type illustrated by uptip 504a' and downtip 506a', then the predetermined proximity may be a horizontal proximity which may be set at approximately 20 pixels.

If the predetermined proximity criteria are met, then the uptip and downtip pair are added to or are used to generate a gap table (not shown) at block 524'. Thereafter, or if the decision at decision block 522' is negative, then the next routine proceeds to decision block 526' where it is determined if the last uptip chord has been processed. If it has not, then the next uptip chord is obtained (block 528') and the routine proceeds back to decision block 522' as shown. If it is the last uptip chord, then it is determined (decision block 530') whether the last downtip chord has been processed. If it has not, then the downtip chord is obtained (block 532') from the downtip chord table and the routine loops back to block 520'. If the decision at decision block 530' is yes, then the uptip and downtip pairs in the gap table are processed as follows:

Computer 34' or video processor 41', for example, obtains the first uptip and downtip pair from the gap table (block 534') and then electronically eliminates or fills in that gap (block 536') by replacing that chord with new data or a new chord corresponding to a white or nonengraved image. At decision block 538' it is determined whether the last gap pair in the gap table has been processed, and if it has, then the routine exits. Otherwise, the next gap pair is obtained (block 540') and the routine loops back to fill in the gap at block 536'.

Advantageously, the gap-fill or discontinuity eliminator provides effective means for eliminating discontinuities or gaps in data where those gaps are unintentional, such as a gap caused by a break in a cell wall. This method and routine may also be used to fill in discontinuities which are intentional, such as a discontinuity or gaps associated with, for example, an engraved area or cut, such as a channel.

By utilizing the embodiments of the present invention, imager 46' can quickly focus on the focus area 313' (FIG. 17) to find a best focus distance or position C. Thereafter, the portion 315' may be focused on and imaged. The array of data corresponding to the image captured may be processed to eliminate undesired images or to fill in gaps. This, in turn, facilitates accurate measurement and error correction during set-up or real-time operation of the engraver. Calibrating or scaling the array of data may further enhance the measurement and error correction process. In addition, altering or changing the illumination between the focusing operation and imaging operation may further enhance the measurement and error correction process. All of these features provide or facilitate providing an engraver which has enhanced focusing, imaging, measuring and engraving characteristics which provide improved means for engraving actual cuts or cells of precisely controlled dimensions.

Figure 19:
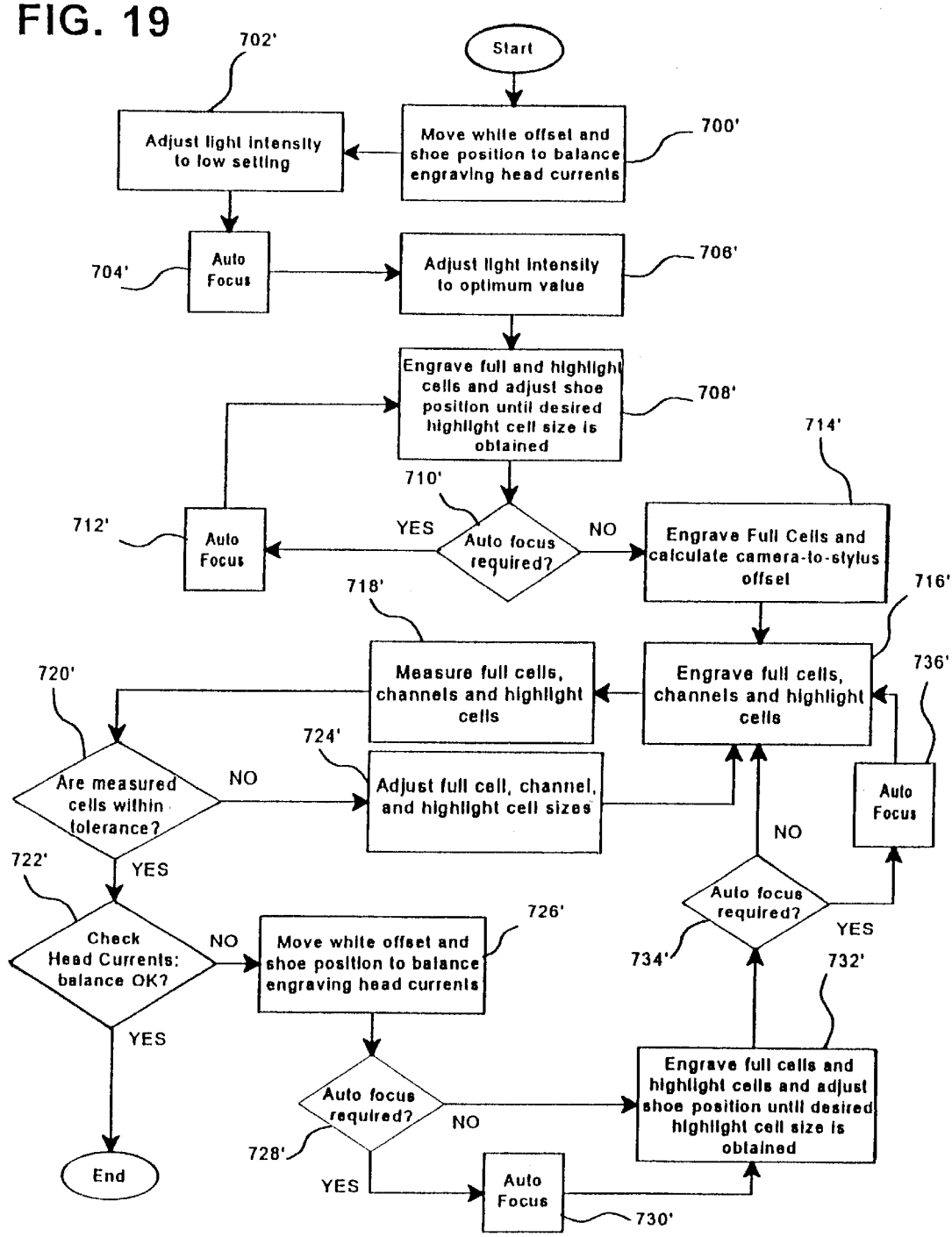
FIG. 19 is a general schematic of a set-up sequence which utilizes one or more of the embodiments described herein.

A method or process of operation using one or more of the embodiments described above will now be described relative to FIG. 19. For ease of illustration, the method will be described relative to a set-up sequence. At block 700 the white offset and shoe position are adjusted to balance the drive signals for energizing engraving head 61' to engrave cells, for example, of predetermined sizes. At block 702', the light intensity is adjusted to the first predetermined intensity level, such as 15 lux, mentioned earlier herein. The autofocusing method described in relation to FIG. 13 is employed at block 704' in order to position camera 206' at the best focus position.

The method proceeds to block 706 where the light intensity is adjusted the second predetermined intensity level, such as 20 lux. A series of cells may then be engraved onto surface 10a' of cylinder 10' (block 708'). One or more of the cells may then be imaged and measured for purposes of determining an error correction in the manner described herein. If it is desired to correct for an error, then computer 34' may energize shoe driver 211' to adjust the position of the shoe 221' in order to obtain an appropriately sized cell (block 708').

At decision block 710', it is determined whether autofocusing again needs to be performed. If it does, then the routine performs the autofocus (block 712') and then loops back to block 708' as shown. If autofocusing is not required at decision block 710', then the engraver may engrave cells and calculate a camera to stylus offset at block 714'.

At block 716', full cells, channels and highlight cells may be engraved again. Thereafter, these cells may be measured (block 718') for purposes of determining if any further error correction is needed. At decision block 720', it is determined whether these cells are within tolerance. If they are, then the routine proceeds to decision block 722' where the engraving head 61' drive signals are checked to determine if they are in balanced to make sure that the engraver head 61' operates in a linear manner. If the answer at decision block 720' is no, then the input parameters associated with the cells are adjusted to correct for undesired error (block 724'). The routine then proceeds back to block 716' as shown.

If the decision at block 722' is negative, the white offset and shoe position may be adjusted to balance the engraving head 61' (block 726'). Thereafter, the method proceeds to decision block 728' where it is determined whether autofocusing is again required (block 728'). If it is, then the autofocus method described above is again employed (block 730'). If the answer at decision block 728' is negative or after autofocusing at block 730' is performed, the method proceeds to block 732' where cells may again be engraved, shoe position adjusted and the like.

At decision block 734', it is determined whether autofocusing is again required. If it is, it is performed at block 736'. If it is not required or after block 736', the process loops back to block 716' as shown.

Advantageously, this method and system may employ some or all of the embodiments described herein during the setup sequence as described above. It should be appreciated, however, that these embodiments may be employed alone or together and may be used during realtime operation. These features facilitate providing a closed-loop system for error correction, measurement, imaging, focusing and engraving which helps reduce the need for manual intervention.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. An engraver for engraving a plurality of cells on a surface of a cylinder engraver comprising:
   a support for rotatably supporting said cylinder;
   an engraving head for engraving an engraved area in said surface of cylinder, said engraving head being mounted in operable relationship with said cylinder when said cylinder is rotatably mounted on said engraver; and
   an image system associated with said engraving head for capturing an image of an area on said surface, said image system comprising an illuminator capable of illuminating said area to a plurality of light intensity levels to facilitate focusing said image system on said area in order to increase the accuracy of a measurement of said engraved area within said area.

2. The engraver as recited in claim 1 wherein said image system comprises an automatic focus camera.

3. The engraver as recited in claim 1 wherein said image system comprises a light source for capturing an image as the cylinder rotates.

4. The engraver as recited in claim 1 wherein said area comprises at least one focal image in the surface of the cylinder.

5. The engraver as recited in claim 4 wherein said at least one focal image is a scratch.

6. The engraver as recited in claim 4 wherein said focal image comprises at least one engraved cell.

7. The engraver as recited in claim 1 wherein said image comprises at least one undesired image, said video processor comprising:
an image eliminator for eliminating undesired image data corresponding to said at least one undesired image.

8. The engraver as recited in claim 7 wherein said image eliminator comprises:
an identifier for identifying undesired image data corresponding to said at least one undesired image in said array of data and for eliminating said undesired image data from said array of data.

9. The engraver as recited in claim 1 wherein said image system comprises:
at least one camera having a depth of focus of about 15–25 microns.

10. The engraver as recited in claim 1, wherein said image system comprises:
at least one camera support for supporting a camera in a generally perpendicular relationship to a surface of said cylinder.

11. The engraver as recited in claim 1, wherein said image system comprises:
at least one camera;
at least one driver for adjusting a relative position between a surface of said cylinder and said at least one camera.

12. The engraver as recited in claim 1 wherein said image system comprises:
at least one camera;
at least one camera support for supporting said at least one camera in operative relationship with said at least one camera and for adjusting a tilt position of said at least one camera relative to a surface of the cylinder.

13. The engraver as recited in claim 1, wherein said image system comprises a light source and further comprises:
a light calibrator for calibrating the light source to a predetermined intensity level.

14. The engraver as recited in claim 13 wherein said predetermined intensity level is about 50–75% of a maximum intensity level.

15. The engraver as recited in claim 1 wherein said image system comprises:
an adjustable support;
a camera mounted on said adjustable support;
a driver associated with said adjustable support and coupled to said video processor for driving said camera towards and away from said cylinder.

16. The engraver as recited in claim 15 wherein said engraver further comprises:
a frame grabber coupled to said camera and said video processor.

17. The engraver as recited in claim 1 wherein said engraver is a gravure engraver.

18. An engraver for engraving a plurality of cells on a surface of a cylinder engraver comprising:
a support for rotatably supporting said cylinder;
an engraving head for engraving said cylinder, said engraving head being mounted in operable relationship with said cylinder when said cylinder is rotatably mounted on said engraver; and
an image system associated with said engraving head for capturing an image of an engraved area on said surface;
wherein said image system further comprises:
a video processor coupled to said image system for generating at least one dimension value corresponding to said image;
said image system comprising an illuminator capable of illuminating said area to a plurality of light intensity levels.

19. The engraver as recited in claim 18 wherein said image system comprises a light calibrator coupled to said video processor for adjusting said image system to facilitate maximizing contrast levels associated with said image.

20. The engraver as recited in claim 19 wherein said image system comprises a frame grabber coupled to said video processor for said frame grabber generating an array of data associated with said image;
said video processor being capable of calibrating said array of data such that data within said array of data are between a maximum intensity value and a minimum intensity value.

21. The engraver as recited in claim 18 wherein said video processor further comprises a dimension value generator for determining at least one actual dimension value in response to an array of data corresponding to said image.

22. The engraver as recited in claim 18 wherein said video processor further comprises:
a discontinuity locator for locating a discontinuity in said image.

23. The engraver as recited in claim 22 wherein said discontinuity locator further comprises:
an identifier for identifying discontinuous data in an array of data corresponding to a discontinuity and for processing said discontinuous data to eliminate said discontinuity.

24. The engraver as recited in claim 23 wherein said image comprises an image of a cell, said discontinuity corresponds to a gap in a wall of said cell.

25. The engraver as recited in claim 24 wherein said identifier further comprises:
a filler routine for filling in said array of data to facilitate eliminating said discontinuity.

26. The engraver as recited in claim 25 wherein said filler routine comprises a locator for locating at least one tip associated with said image.

27. An engraver for engraving a plurality of cells on a surface of a cylinder engraver comprising:
a support for rotatably supporting said cylinder;
an engraving head for engraving said cylinder, said engraving head being mounted in operable relationship with said cylinder when said cylinder is rotatably mounted on said engraver;
an image system associated with said engraving head for capturing an image of an engraved area on said surface; and
wherein said system comprises:
a focus area and an engraved area, said image system comprising a light calibrator coupled to a video processor for illuminating said focus area to a first predetermined light intensity and for illuminating said engraved area with a second predetermined light intensity.

28. The engraver as recited in claim 27 wherein said first predetermined light intensity is less than said second predetermined light intensity.

29. The engraver as recited in claim 27 wherein said wherein said first predetermined light intensity is at least 15 lux and said second predetermined light intensity is at least 20 lux.

30. An engraver for engraving a plurality of cells on a surface of a cylinder engraver comprising:
a support for rotatably supporting said cylinder;

an engraving head for engraving said cylinder, said engraving head being mounted in operable relationship with said cylinder when said cylinder is rotatably mounted on said engraver;

an image system associated with said engraving head for capturing an image of an engraved area on said surface; and wherein said image comprises:
- an undesired image comprising an associated plurality of chords, said image system further comprising:
    - an image eliminator for eliminating any of said associated plurality of chords.

31. The engraver as recited in claim 30 wherein said eliminated chord is less than 20 pixels in length.

32. An engraver for engraving a plurality of cells on a surface of a cylinder engraver comprising:

a support for rotatably supporting said cylinder;

an engraving head for engraving said cylinder, said engraving head being mounted in operable relationship with said cylinder when said cylinder is rotatably mounted on said engraver;

an image system associated with said engraving head for capturing an image of an engraved area on said surface; and wherein said image system comprises a light source and further comprises:
- a light calibrator for calibrating the light source to a predetermined intensity level;
- wherein said light calibrator comprises a light calibration processor for generating an intensity index and focal index and also for determining an approximate focal distance using said intensity index and a actual focal distance using said focal index.

33. The engraver as recited in claim 32 wherein said intensity index is average light level and said focal index comprises a high spatial frequency.

* * * * *